United States Patent
Liu et al.

(10) Patent No.: US 12,219,605 B2
(45) Date of Patent: Feb. 4, 2025

(54) TRANSMISSION METHOD AND APPARATUS

(71) Applicant: HUAWEI TECHNOLOGIES CO., LTD., Guangdong (CN)

(72) Inventors: Jianqin Liu, Beijing (CN); Xu Zhang, Beijing (CN); Lixia Xue, Beijing (CN); Yongxing Zhou, Beijing (CN); Yuan Li, Bonn (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 742 days.

(21) Appl. No.: 17/333,673

(22) Filed: May 28, 2021

(65) Prior Publication Data

US 2021/0289561 A1 Sep. 16, 2021

Related U.S. Application Data

(63) Continuation of application No. PCT/CN2019/122221, filed on Nov. 29, 2019.

(30) Foreign Application Priority Data

Nov. 30, 2018 (CN) .......................... 201811463760.0

(51) Int. Cl.
*H04W 74/08* (2024.01)
*H04L 5/00* (2006.01)
(Continued)

(52) U.S. Cl.
CPC ....... *H04W 74/0833* (2013.01); *H04L 5/0048* (2013.01); *H04W 52/36* (2013.01); *H04W 72/044* (2013.01); *H04W 72/1268* (2013.01)

(58) Field of Classification Search
None
See application file for complete search history.

(56) References Cited

U.S. PATENT DOCUMENTS 10,383,067 B2 * 8/2019 Lin ...................... H04W 52/367
10,602,456 B2 * 3/2020 Li ........................ H04W 52/242
(Continued)

FOREIGN PATENT DOCUMENTS

CN 102017723 A 4/2011
CN 102271400 A 12/2011
(Continued)

OTHER PUBLICATIONS

3GPP TSG RAN WG1 NR Ad Hoc, R1-1700892,NR 2-step random access procedure,Samsung,Spokane, Washington, USA, Jan. 16-20, 2017,total 5 pages.
(Continued)

*Primary Examiner* — Steve R Young
(74) *Attorney, Agent, or Firm* — WOMBLE BOND DICKINSON (US) LLP

(57) ABSTRACT

This application provides a transmission method and apparatus. The method includes: A terminal sends a random access preamble to a base station at a first transmit power, and sends a PUSCH to the base station at a second transmit power, where power deviation between the first transmit power and the second transmit power is indicated to the base station by indication information; and the terminal receives a random access response or a contention resolution message from the base station. Implementing this application can improve an existing random access procedure, so that the random access procedure is adapted to scenario requirements such as low delay, high reliability, and large-scale terminal access.

13 Claims, 12 Drawing Sheets

(51) Int. Cl.
*H04W 52/36* (2009.01)
*H04W 72/04* (2023.01)
*H04W 72/044* (2023.01)
*H04W 72/12* (2023.01)
*H04W 72/1268* (2023.01)
*H04W 74/0833* (2024.01)

(56) References Cited

U.S. PATENT DOCUMENTS

| | | | |
|---|---|---|---|
| 10,992,425 B2 * | 4/2021 | Nogami | H04L 1/1864 |
| 2009/0286566 A1 * | 11/2009 | Lindholm | H04W 52/242 |
| | | | 455/522 |
| 2013/0272229 A1 | 10/2013 | Dinan | |
| 2015/0358960 A1 * | 12/2015 | Zhang | H04W 52/146 |
| | | | 455/450 |
| 2016/0353440 A1 | 12/2016 | Lee et al. | |
| 2018/0097590 A1 * | 4/2018 | Ly | H04L 5/0037 |
| 2018/0279376 A1 | 9/2018 | Dinan et al. | |
| 2019/0165896 A1 * | 5/2019 | Huang | H04L 1/1664 |
| 2021/0235389 A1 * | 7/2021 | Yao | H04W 52/365 |
| 2021/0329703 A1 * | 10/2021 | Yang | H04L 5/001 |

FOREIGN PATENT DOCUMENTS

| | | |
|---|---|---|
| CN | 111769928 A | 10/2020 |
| EP | 2770792 A1 | 8/2014 |
| WO | 2010008859 A1 | 1/2010 |
| WO | 2014166066 A1 | 10/2014 |

OTHER PUBLICATIONS

3GPP TSG RAN WG2 #103bis, R2-1815157,2-Step CBRA procedure for NR-U,LG Electronics Inc.Chengdu, China, Oct. 8-12, 2018, total 3 pages.

3GPP TS 38.321 V15.3.0:"3rd Generation Partnership Project; Technical Specification Group Radio Access Network; NR;Medium Access Control (MAC) protocol specification(Release 15)",Sep. 2018,total 76 pages.

* cited by examiner

TRANSMISSION METHOD AND APPARATUS

CROSS-REFERENCE TO RELATED APPLICATIONS

This application is a continuation of International patent application NO. PCT/CN2019/122221, filed on Nov. 29, 2019, which claims priority to Chinese Patent Application No. 201811463760.0, filed on Nov. 30, 2018, The disclosures of the aforementioned applications are hereby incorporated by reference in their entireties.

TECHNICAL FIELD

The present disclosure relates to the communication field, and in particular, to a transmission method and apparatus.

BACKGROUND

A conventional initial random access procedure is classified into a non-contention-based random access procedure and a contention-based random access procedure. If a random access procedure is a contention-based random access procedure, user equipment (UE for short) randomly selects a random access preamble sequence locally. If the random access procedure is a non-contention-based random access procedure, the UE may obtain a random access preamble sequence from scheduling information of a random access preamble sent by a base station by using a physical downlink control channel (PDCCH) order.

In a Long Term Evolution (LTE) system, a contention-based random access procedure is shown in FIG. 1, and mainly includes four steps:

1: The UE randomly selects a random access preamble, which is also referred to as a message 1 (Msg1), and sends the preamble to a node B (eNodeB) on a physical random access channel (PRACH for short). The preamble is used to request uplink synchronization.

2: After receiving the preamble, the eNodeB sends a random access response (RAR), which is also referred to as a message 2 (Msg2), to the UE. The RAR is a response of the eNodeB to the preamble. The random access response includes the following information: a number of the received preamble, a time adjustment amount corresponding to the received preamble, and uplink resource location indication information and a temporary cell radio network temporary identifier (Temporary C-RNTI) that are allocated to a terminal.

3: After receiving the random access response, the UE sends an uplink message, which is also referred to as a message 3 (Msg3), on an allocated uplink resource based on the indication of the random access response, to request to set up an RRC connection. The uplink message needs to include at least a unique identifier temporary mobile subscriber identity (TMSI) or a random identifier (ID) of the terminal. In addition, the uplink resource further carries a demodulation reference signal (DMRS). The DMRS is a reference signal sent by the UE when the UE sends a physical uplink shared channel or physical uplink control channel (PUSCH/PUCCH), and is used as a reference signal for demodulation when the eNodeB receives uplink data/control information.

4: After receiving the uplink message from the UE, the eNodeB sends a contention resolution message, which is also referred to as a message 4 (Msg4), to the UE accessed successfully. The contention resolution message needs to include at least a unique ID (namely, a TMSI) or a random ID of a terminal accessed successfully. If the UE receives a contention resolution related to a user identifier of the UE, it is considered that random access of the UE is successful. The UE changes from an RRC idle state to an RRC connected state, RRC connection setup (RRC connection setup) is completed, and the random access procedure is completed.

Considering scenario requirements such as low delay, high reliability, and large-scale terminal access of a future communication protocol (for example, a fifth-generation mobile communication technology, (5G)) low delay, in these scenarios, an access resource preempted by the UE for data transmission is relatively valuable, the existing random access procedure has become complex and inefficient, and new technologies are urgently needed to improve the existing random access procedure.

SUMMARY

Embodiments of the present disclosure provide a transmission method and apparatus, to improve an existing random access procedure, and help enable the random access procedure to be adapted to scenario requirements such as low delay, high reliability, and large-scale terminal access.

According to a first aspect, the present disclosure provides a transmission method. The method includes: A terminal sends, to a base station at a first transmit power, a random access preamble carried in a physical random access channel (PRACH), and sends a physical uplink shared channel (PUSCH) to the base station at a second transmit power. A power deviation between the first transmit power and the second transmit power is indicated to the base station by using indication information. In other words, the indication information is used to enable the base station to determine the power deviation between the first transmit power and the second transmit power. The terminal receives a random access response or a contention resolution message from the base station.

According to a second aspect, the present disclosure provides another transmission method. The method includes: A base station receives a random access preamble sent by a terminal at a first transmit power, and receives a PUSCH sent by the terminal at a second transmit power; the base station determines a power deviation between the first transmit power and the second transmit power by using indication information of the terminal; and the base station sends a random access response or a contention resolution message to the terminal.

It can be learned that, based on the first aspect and the second aspect, the terminal transmits the indication information to the base station in an initial random access procedure, so that the base station can determine a transmit power deviation between the preamble and the PUSCH based on the indication information, so that an association is generated between the preamble and the PUSCH. Considering a future communication protocol (for example, 5G) scenario, a radio resource preempted by the terminal for data transmission is relatively valuable. Therefore, the association facilitates sharing of radio resources between the preamble and the PUSCH (for example, facilitates using the power deviation, so that the preamble bears a function of demodulating the PUSCH), and facilitates simultaneous execution of operation 1 and operation 3 of the initial random access procedure in the related art. Therefore, implementing the technical solutions of the present disclosure can improve radio resource utilization, improve resource transmission efficiency in the random access procedure, and reduce an access delay of the terminal in radio access.

In one embodiment the random access preamble is used as a demodulation reference signal of the PUSCH. When sending the preamble and the PUSCH, the terminal sends, to the base station, the indication information used to indicate the transmit power deviation. In this way, the base station can successfully demodulate uplink data of the PUSCH by using the preamble based on the power deviation, and the PUSCH may no longer carry the demodulation reference signal, so that more time-frequency resource space can be released for the PUSCH. In a future communication protocol (for example, 5G) scenario, a radio resource preempted by the terminal for data transmission is relatively valuable. Therefore, implementing the technical solutions of the present disclosure can improve radio resource utilization and meet a scenario requirement of large-scale terminal access.

In one embodiment the random access preamble is used as a front-loaded demodulation reference signal (which may be referred to as a front-loaded DMRS for short) of the PUSCH. The demodulation reference signal of the PUSCH further includes an additional demodulation reference signal (which may be referred to as an additional DMRS for short) of the PUSCH. The front-loaded demodulation reference signal of the PUSCH and the additional demodulation reference signal (which may be referred to as an additional DMRS for short) of the PUSCH are jointly used for demodulation of the PUSCH. When sending the preamble and the PUSCH, the terminal sends, to the base station, the indication information used to indicate the transmit power deviation. In this way, the base station can successfully demodulate uplink data of the PUSCH by using the preamble and the additional DMRS based on the power deviation, and the PUSCH carries some DMRSs (namely, additional DMRSs) instead of all demodulation reference signals (DMRSs), and a resource density of the additional DMRSs is lower than a resource density of the DMRSs, so that some time-frequency resource space can be released for the PUSCH. In a future communication protocol (for example, 5G) scenario, a radio resource preempted by the terminal for data transmission is relatively valuable. Therefore, implementing the technical solutions of the present disclosure can improve radio resource utilization, and meet a scenario requirement of large-scale terminal access.

In one embodiment the indication information is indicated to the base station specifically in one of the following manners:

In a specific application scenario, the indication information is indicated to the base station by using the random access preamble.

In another specific application scenario, the indication information is indicated to the base station by using the PRACH that carries the random access preamble.

Alternatively, in still another specific application scenario, the indication information is indicated to the base station by using the PUSCH.

It can be learned that, in this embodiment of the present disclosure, a carrier of the indication information may be designed based on a specific application scenario. Therefore, implementing the technical solutions of the present disclosure can improve radio resource utilization and meet design requirements of various application scenarios.

In one embodiment the indication information is further used to indicate at least one of an attribute of the first transmit power and an attribute of the second transmit power. The attribute of the first transmit power is a maximum transmit power of the terminal or a first calculated power of the random access preamble; or the attribute of the second transmit power is a maximum transmit power of the terminal or a second calculated power of the PUSCH.

When the first calculated power is greater than or equal to the maximum transmit power, the attribute of the first transmit power is the maximum transmit power.

When the first calculated power is less than the maximum transmit power, the attribute of the first transmit power is the first calculated power.

When the second calculated power is greater than or equal to the maximum transmit power, the attribute of the second transmit power is the maximum transmit power.

Alternatively, when the second calculated power is less than the maximum transmit power, the attribute of the second transmit power is the second calculated power.

For example, in one embodiment, the indication information is used to indicate both the attribute of the first transmit power and the attribute of the second transmit power. In other words, in this case, the terminal indicates, to the base station by using the indication information, that power usage states of the PUSCH and the preamble are respectively the maximum transmit power or a calculated actual power of the terminal. A possible power usage state combination formed by the power usage states includes at least one of the following combinations:

{PRACH_max, PUSCH_max};
{PRACH_required, PUSCH_required};
{PRACH_max, PUSCH_required}; and
{PRACH_required, PUSCH_max}, where PUSCH_required represents a power state in which a power used for sending the PUSCH is actually obtained through calculation based on a formula;

PRACH_required represents a power state in which a power used for sending the preamble is actually obtained through calculation based on a formula;

PUSCH_max represents a power state in which a power used for sending the PUSCH is a full power (namely, the maximum transmit power of the terminal); and PRACH_max represents a power state in which a power used for sending the preamble is a full power (namely, the maximum transmit power of the terminal).

In this way, the base station can successfully obtain the power deviation between the first transmit power and the second transmit power based on the power usage state combination, and then demodulate uplink data of the PUSCH by using the preamble. This embodiment of the present disclosure can also effectively improve resource transmission efficiency.

In one embodiment, the indication information is specifically used to indicate a quantized value of a difference between the first transmit power and the second transmit power. In other words, in this case, the terminal can directly report an index of a power difference between the PUSCH and the preamble. The power difference herein is, for example, a quantized power deviation value predefined between the base station and the terminal. For example, candidate values of the quantized power deviation may be {−3, −2, −1, 0, +1, +2, +3, +4}, and corresponding reported indexes may be 0, 1, 2, 3, 4, 5, 6, and 7 respectively. The base station derives a power deviation value between the first transmit power and the second transmit power based on a mapping relationship between the reported indexes and corresponding candidate values of the power deviation.

In this way, the base station can successfully demodulate uplink data of the PUSCH by using the preamble based on the power deviation. This embodiment of the present disclosure can also effectively improve resource transmission efficiency.

In one embodiment, the indication information may be carried in the PRACH/preamble, and the indication information may be indicated by using the random access preamble or the PRACH that carries the random access preamble specifically in one or more of the following indication manners:

the indication information is indicated based on a mapping relationship between the indication information and a time domain resource of the PRACH;

the indication information is indicated based on a mapping relationship between the indication information and a frequency domain resource of the PRACH; and the indication information is indicated based on a mapping relationship between the indication information and a code resource of the random access preamble.

In other words, the terminal may establish a mapping relationship between a time domain resource, and/or a frequency domain resource, and/or a preamble corresponding to the PRACH and a power usage state combination (or an index of the power deviation), and indicate the power usage state combination to the base station by using the mapping relationship or directly indicate the power difference between the PUSCH and the preamble. Therefore, implementing the embodiments of the present disclosure helps fully utilize radio resources to transmit the indication information, improve transmission efficiency, and meet a scenario requirement of large-scale terminal access.

In one embodiment, the indication information may be carried in the PUSCH, and the indication information may be indicated by using the PUSCH in specifically one or more of the following indication manners:

the indication information is indicated based on a mapping relationship between the indication information and a time domain resource of the PUSCH; and the indication information is indicated based on a mapping relationship between the indication information and a frequency domain resource of the PUSCH.

In other words, the terminal may establish a mapping relationship between a time domain resource and/or a frequency domain resource corresponding to the PUSCH and a power usage state combination (or an index of the power deviation), and indicate the power usage state combination to the base station by using the mapping relationship or directly indicate the power difference between the PUSCH and the preamble. Therefore, implementing the embodiments of the present disclosure helps fully utilize radio resources to transmit the indication information, improve transmission efficiency, and meet a scenario requirement of large-scale terminal access.

In one embodiment when the preamble is used as a front-loaded demodulation reference signal of the PUSCH, and the PUSCH further carries an additional demodulation reference signal of the PUSCH, the indication information may be indicated by using the PRACH in one or more of the following indication manners:

the indication information is indicated based on a mapping relationship between the indication information and a time domain resource of the PRACH; and the indication information is indicated based on a mapping relationship between the indication information and a frequency domain resource of the PRACH.

In other words, the terminal may establish a mapping relationship between a time domain resource and/or a frequency domain resource corresponding to the PRACH and a power usage state combination (or an index of the power deviation), and indicate the power usage state combination to the base station by using the mapping relationship or directly indicate the power difference between the PUSCH and the preamble. Therefore, implementing this embodiment of the present disclosure helps the base station obtain the indication information by using the mapping relationship between the indication information and the radio resource, thereby effectively improving resource transmission efficiency.

In one embodiment when the preamble is used as a front-loaded demodulation reference signal of the PUSCH, and the PUSCH further carries an additional demodulation reference signal of the PUSCH, the indication information may be indicated by using the PUSCH in one or more of the following indication manners:

the indication information is indicated based on a mapping relationship between the indication information and a time domain resource of the PUSCH;

the indication information is indicated based on a mapping relationship between the indication information and a frequency domain resource of the PUSCH; and the indication information is indicated based on a mapping relationship between the indication information and an additional demodulation reference signal sequence of the PUSCH.

In other words, the terminal may establish a mapping relationship between a time domain resource and/or a frequency domain resource, and/or an additional demodulation reference signal sequence corresponding to the PUSCH and a power usage state combination (or an index of the power deviation), and indicate the power usage state combination to the base station by using the mapping relationship or directly indicate the power difference between the PUSCH and the preamble. Therefore, implementing this embodiment of the present disclosure helps the base station obtain the indication information by using the mapping relationship between the indication information and the radio resource, thereby effectively improving resource transmission efficiency.

In one embodiment before the terminal receives a random access response or a contention resolution message from the base station, the method further includes: sending the indication information to the base station.

In other words, in another specific application scenario, the terminal may further send the indication information to the base station by using a communication channel independent of the PRACH and the PUSCH.

In one embodiment before the terminal sends a random access preamble to a base station at a first transmit power, and sends a PUSCH to the base station at a second transmit power, the method further includes:

The terminal obtains a higher layer signaling parameter of the random access preamble and a higher layer signaling parameter of the PUSCH. The higher layer signaling parameter of the random access preamble and the higher layer signaling parameter of the PUSCH are both configured by the base station for the terminal, set by the terminal, or configured by the base station but not configured by the terminal by using the base station, and are configured based on previous configuration or set by the terminal. The higher layer signaling parameter of the PUSCH includes a power compensation factor (which certainly may not be included).

The terminal obtains the first calculated power based on the higher layer signaling parameter of the random access preamble and a path loss value obtained by the terminal, and obtains the first transmit power based on the first calculated power.

The terminal assumes (or sets) a value of the power compensation factor as 1, obtains the second calculated power based on the higher layer signaling parameter of the PUSCH and the path loss value obtained by the terminal, and obtains the second transmit power based on the second calculated power.

For example, in an initial random access scenario, the terminal may first determine whether the value of the power compensation factor configured by the base station for the terminal by using higher layer signaling is 1. If the value is not 1, the terminal assumes the value of the power compensation factor as 1, and then calculates a transmit power of the PUSCH.

For example, in another initial random access scenario, the terminal may directly assign 1 to the power compensation factor in a process of calculating a transmit power of the PUSCH.

In a specific embodiment of the present disclosure, the random access preamble is used as a Msg3, namely, the demodulation reference signal of the PUSCH, and the terminal assumes the value of the power compensation factor as 1. When sending the preamble and the PUSCH, the terminal sends, to the base station, indication information used to indicate the power usage states of the PUSCH and the preamble. In this way, the base station can determine whether transmit powers of the PUSCH and the preamble of the terminal are respectively a calculated power or a full power, and can also calculate a power deviation between the transmit powers of the PUSCH and the preamble, so that uplink data of the PUSCH can be successfully demodulated by using the preamble. In addition, the PUSCH may no longer carry the demodulation reference signal, so that more time-frequency resource space can be released for the PUSCH. Therefore, implementing the technical solutions of the present disclosure can improve radio resource utilization and meet a scenario requirement of large-scale terminal access.

In one embodiment in a case of frequency division multiplexing on the random access preamble and the PUSCH, the method further includes: The terminal performs power scaling processing on a first pre-transmit power and a second pre-transmit power based on a scaling factor, to obtain the first transmit power and the second transmit power. A sum of the first transmit power and the second transmit power is less than or equal to a maximum transmit power of the terminal. The scaling factor is predefined or configured by the base station for the terminal, the first pre-transmit power is a smaller value between the first calculated power and the maximum transmit power, and the second pre-transmit power is a smaller value between the second calculated power and the maximum transmit power.

It can be learned that, according to this embodiment of the present disclosure, in a case of frequency division multiplexing on the PRACH and the PUSCH, the terminal performs scaling processing on transmit powers of the PRACH and the PUSCH, to avoid damage to transmit performance of the terminal; and then, transmit indication information to the base station in the initial random access procedure, so that the base station can determine the transmit power deviation between the PRACH and the PUSCH based on the indication information. In this way, processing performance of the base station is improved, the existing initial access procedure is improved, and procedure operations are reduced, thereby reducing an access delay of the terminal in radio access, and improving transmission efficiency in the random access procedure and service processing reliability of the base station.

According to a third aspect, the present disclosure provides still another transmission method. The method includes: A terminal receives a higher layer signaling parameter of a random access preamble and a higher layer signaling parameter of a PUSCH from a base station, where the higher layer signaling parameter of the PUSCH includes a power compensation factor; the terminal obtains a first calculated power based on the higher layer signaling parameter of the random access preamble and a path loss value obtained by the terminal, and obtains a first transmit power based on the first calculated power; the terminal assumes a value of the power compensation factor as 1, obtains a second calculated power based on the higher layer signaling parameter of the PUSCH and the path loss value obtained by the terminal, and obtains a second transmit power based on the second calculated power; the terminal sends the random access preamble to the base station at the first transmit power, and sends the PUSCH to the base station at the second transmit power, where the random access preamble is used as a demodulation reference signal or a front-loaded demodulation reference signal of the PUSCH; and the terminal receives a random access response or a contention resolution message from the base station.

According to a fourth aspect, the present disclosure provides still another transmission method. The method includes: A base station sends a higher layer signaling parameter of a random access preamble and a higher layer signaling parameter of a PUSCH to a terminal, where the higher layer signaling parameter of the PUSCH includes a power compensation factor; the base station receives the random access preamble sent by the terminal at a first transmit power, and receives the PUSCH sent by the terminal at a second transmit power, where the random access preamble is used as a demodulation reference signal or a front-loaded demodulation reference signal of the PUSCH; the base station calculates a power deviation between the first transmit power and the second transmit power, where the first transmit power is obtained based on a first calculated power, and the first calculated power is obtained through calculation based on the higher layer signaling parameter of the random access preamble and a path loss value obtained by the terminal; and the second transmit power is obtained based on a second calculated power, where the second calculated power is obtained through calculation based on the higher layer signaling parameter of the PUSCH and the path loss value obtained by the terminal, and a value of the power compensation factor is 1; and the base station sends a random access response or a contention resolution message to the terminal.

It can be learned that, based on the third aspect and the fourth aspect, in this embodiment of the present disclosure, the random access preamble may be used as a Msg3, namely, the demodulation reference signal or the front-loaded demodulation reference signal of the PUSCH, and the terminal assumes the value of the power compensation factor as 1. In this way, the base station can calculate a power deviation between transmit powers of the PUSCH and the preamble, so that uplink data of the PUSCH can be successfully demodulated by using the preamble. Therefore, implementing the technical solutions of the present disclosure can improve radio resource utilization and meet a scenario requirement of large-scale terminal access.

In one embodiment the random access preamble is used as a front-loaded demodulation reference signal of the PUSCH, and the demodulation reference signal of the PUSCH further includes an additional demodulation reference signal of the PUSCH.

It can be learned that in this embodiment of the present disclosure, the preamble and the additional DMRS of the PUSCH are used as a Msg3, namely, the demodulation reference signal of the PUSCH, and the PUSCH only needs to carry low-density DMRSs (namely, additional DMRSs). In addition, the terminal assumes the value of the power compensation factor of the PUSCH as 1. When sending the preamble and the PUSCH, the terminal sends, to the base station, indication information used to indicate power usage states of the PUSCH and the preamble. In this way, the base station can calculate the power deviation between the transmit powers of the PUSCH and the preamble, so that uplink data of the PUSCH can be successfully demodulated by using the preamble and the additional DMRS. In addition, the PUSCH carries some DMRSs (additional DMRSs), and does not need to carry all demodulation reference signals (DMRSs), and resource density of the additional DMRSs is lower than a resource density of the DMRSs, so that some time-frequency resource space can be released for the PUSCH. Therefore, implementing the technical solutions of the present disclosure can improve radio resource utilization, meet a scenario requirement of large-scale terminal access, and improve reliability of an initial random access procedure.

In one embodiment the random access preamble or the PUSCH is further used to carry indication information, and the indication information is used to enable the base station to determine the power deviation between the first transmit power and the second transmit power.

It can be learned that in this embodiment of the present disclosure, when sending the preamble and the PUSCH, the terminal sends, to the base station, indication information used to indicate the power usage states of the PUSCH and the preamble. In this way, the base station can directly determine the power deviation between the transmit powers of the PUSCH and the preamble, or may determine whether the transmit powers of the PUSCH and the preamble of the terminal are respectively a calculated power or a full power, and then calculate a power deviation between transmit powers of the PUSCH and the PRACH. Therefore, uplink data of the PUSCH can be successfully demodulated by using the preamble (or the preamble and the additional DMRS) the. In addition, the PUSCH carries some DMRSs (additional DMRSs) or does not need to carry the DMRS, so that time-frequency resource space can be released for the PUSCH. Therefore, implementing the technical solutions of the present disclosure can improve radio resource utilization, meet a scenario requirement of large-scale terminal access, and improve reliability of an initial random access procedure.

According to a fifth aspect, the present disclosure provides still another transmission method. The method includes: A terminal obtains a first pre-transmit power of a random access preamble and a second pre-transmit power of a PUSCH, where the first pre-transmit power is a smaller value between a first calculated power of the random access preamble and a maximum transmit power of the terminal, and the second pre-transmit power is a smaller value between a second calculated power of the random access preamble and the maximum transmit power of the terminal; the terminal performs power scaling processing on the first pre-transmit power and the second pre-transmit power based on a scaling factor, to obtain a first transmit power and a second transmit power, where a sum of the first transmit power and the second transmit power is less than or equal to the maximum transmit power; and the scaling factor is predefined or configured by the base station for the terminal; the terminal sends the random access preamble to the base station at the first transmit power, and sends the PUSCH to the base station at the second transmit power; and the terminal receives a random access response or a contention resolution message from the base station.

It can be learned that, according to this embodiment of the present disclosure, in a case of frequency division multiplexing on the PRACH and the PUSCH, the terminal performs scaling processing on transmit powers of the preamble and the PUSCH, to avoid damage to transmit performance of the terminal. In this way, processing performance of the base station is improved, thereby reducing an access delay of the terminal in radio access, and improving transmission efficiency in a random access procedure and service processing reliability of the base station.

In one embodiment the random access preamble is used as a demodulation reference signal of the PUSCH. In another possible implementation, the random access preamble is used as a front-loaded demodulation reference signal of the PUSCH; and the demodulation reference signal of the PUSCH further includes an additional demodulation reference signal of the PUSCH.

In one embodiment the random access preamble or the PUSCH is further used to carry indication information, and the indication information is used to enable the base station to determine a power deviation between the first transmit power and the second transmit power.

It can be learned that, according to this embodiment of the present disclosure, in a case of frequency division multiplexing on the PRACH and the PUSCH, the terminal performs scaling processing on transmit powers of the PRACH and the PUSCH, to avoid damage to transmit performance of the terminal. When sending the preamble and the PUSCH, the terminal sends, to the base station, indication information used to indicate power usage states of the PUSCH and the preamble. In this way, the base station can directly determine the power deviation between transmit powers of the PUSCH and the preamble, or may determine whether the transmit powers of the PUSCH and the preamble of the terminal are respectively a calculated power or a full power, and then calculate the power deviation between the transmit powers of the PUSCH and the preamble. Therefore, uplink data of the PUSCH can be successfully demodulated by using the preamble (or the preamble and the additional DMRS). In this way, processing performance of the base station is improved, thereby reducing an access delay of the terminal in radio access, and improving transmission efficiency in a random access procedure and service processing reliability of the base station.

According to a sixth aspect, an embodiment of the present disclosure provides an apparatus. The apparatus may be a terminal, and the terminal includes a calculation module and a communication module.

The calculation module is configured to calculate a first transmit power used for sending a random access preamble and a second transmit power used for sending a PUSCH.

The communication module is configured to send the random access preamble to a base station at the first transmit power, and send the PUSCH to the base station at the second transmit power, where a power deviation between the first transmit power and the second transmit power is indicated to the base station by using indication information.

The communication module is further configured to receive a random access response or a contention resolution message from the base station.

Each module of the terminal is specifically configured to implement the method according to the first aspect.

According to a seventh aspect, an embodiment of the present disclosure provides an apparatus. The apparatus may be a base station, and the base station includes a communication module and a processing module.

The communication module is configured to: receive a random access preamble sent by a terminal at a first transmit power, and receive a PUSCH sent by the terminal at a second transmit power.

The processing module is configured to determine a power deviation between the first transmit power and the second transmit power by using indication information of the terminal.

The communication module is further configured to send a random access response or a contention resolution message to the terminal.

Each module of the base station is specifically configured to implement the method according to the second aspect.

According to an eighth aspect, an embodiment of the present disclosure provides another apparatus. The terminal includes a calculation module and a communication module.

The communication module is configured to receive a higher layer signaling parameter of a random access preamble and a higher layer signaling parameter of a PUSCH from a base station, where the higher layer signaling parameter of the PUSCH includes a power compensation factor.

The calculation module is configured to obtain a first calculated power based on the higher layer signaling parameter of the random access preamble and a path loss value obtained by the terminal, and obtain a first transmit power based on the first calculated power; and assume a value of the power compensation factor as 1, obtain a second calculated power based on the higher layer signaling parameter of the PUSCH and the path loss value obtained by the terminal, and obtain a second transmit power based on the second calculated power.

The communication module is further configured to send the random access preamble to the base station at the first transmit power, and send the PUSCH to the base station at the second transmit power, where the random access preamble is used as a demodulation reference signal or a front-loaded demodulation reference signal of the PUSCH.

The communication module is further configured to receive a random access response or a contention resolution message from the base station.

Each module of the terminal is specifically configured to implement the method according to the third aspect.

According to a ninth aspect, an embodiment of the present disclosure provides another apparatus. The base station includes a processing module and a communication module.

The communication module is configured to send a higher layer signaling parameter of a random access preamble and a higher layer signaling parameter of a PUSCH to a terminal, where the higher layer signaling parameter of the PUSCH includes a power compensation factor.

The communication module is further configured to receive the random access preamble sent by the terminal at a first transmit power, and receive the PUSCH sent by the terminal at a second transmit power, where the random access preamble is used as a demodulation reference signal or a front-loaded demodulation reference signal of the PUSCH.

The processing module is configured to obtain a power deviation between the first transmit power and the second transmit power through calculation. The first transmit power is obtained based on a first calculated power, and the first calculated power is obtained through calculation based on the higher layer signaling parameter of the random access preamble and a path loss value obtained by the terminal; and the second transmit power is obtained based on a second calculated power, the second calculated power is obtained through calculation based on the higher layer signaling parameter of the PUSCH and the path loss value obtained by the terminal, and a value of the power compensation factor is 1.

The communication module is further configured to send a random access response or a contention resolution message to the terminal.

Each module of the base station is specifically configured to implement the method according to the fourth aspect.

According to a tenth aspect, an embodiment of the present disclosure provides another apparatus. The terminal includes a calculation module and a communication module.

The calculation module is configured to calculate a first pre-transmit power of a random access preamble and a second pre-transmit power of a PUSCH. The first pre-transmit power is a smaller value between a first calculated power of the random access preamble and a maximum transmit power of the terminal, and the second pre-transmit power is a smaller value between a second calculated power of the random access preamble and the maximum transmit power of the terminal.

The calculation module is further configured to perform power scaling processing on the first pre-transmit power and the second pre-transmit power based on a scaling factor, to obtain a first transmit power and a second transmit power, where a sum of the first transmit power and the second transmit power is less than or equal to the maximum transmit power; and the scaling factor is predefined or configured by the base station for the terminal.

The communication module is configured to send the random access preamble to the base station at the first transmit power, and send the PUSCH to the base station at the second transmit power.

The communication module is further configured to receive a random access response or a contention resolution message from the base station.

Each module of the terminal is specifically configured to implement the method according to the fifth aspect.

According to an eleventh aspect, an embodiment of the present disclosure provides another apparatus. The terminal includes a processor, a memory, and a transceiver, and the processor. The memory, and the transceiver are connected to each other by using a bus. The processor in the terminal is configured to read program code stored in the memory, and perform the method according to any one of the first aspect to the fifth aspect.

According to a twelfth aspect, an apparatus is provided. The apparatus provided in this embodiment of the present disclosure has a function of implementing behavior of a terminal (or referred to as a terminal device) or a base station (or referred to as a base station device) in the foregoing method aspects, and includes a corresponding means (means) configured to perform the operations or functions described in the foregoing method aspects. The operations or functions may be implemented by using software, or by using hardware (for example, a circuit), or by using a combination of hardware and software.

In one embodiment, the apparatus includes one or more processors and a communication unit. The one or more processors are configured to support the apparatus in performing a corresponding function of the terminal device in the foregoing method. For example, uplink data is sent to a network device based on reference signal indication information. The communication unit is configured to support the apparatus in communicating with another device, to implement a receiving and/or sending function.

In one embodiment, the apparatus may further include one or more memories. The memory is configured to be coupled to the processor, and stores program instructions and/or data necessary for the apparatus. The one or more memories may be integrated with the processor, or may be disposed separately from the processor. This is not limited in this embodiment of the present disclosure.

When the apparatus is a terminal, the apparatus may be an intelligent terminal, a wearable device, or the like, and the communication unit may be a transceiver or a transceiver circuit. In one embodiment, the transceiver may alternatively be an input/output circuit or an interface.

The apparatus may alternatively be a communication chip. The communication unit may be an input/output circuit or an interface of the communication chip.

In one embodiment, the apparatus includes a transceiver, a processor, and a memory. The processor is configured to control a transceiver or an input/output circuit to receive and send a signal, the memory is configured to store a computer program, and the processor is configured to run the computer program in the memory, so that the apparatus performs the method completed by the terminal device in any method according to any one of the first aspect to the fifth aspect.

In one embodiment, the apparatus includes one or more processors and a communication unit. The one or more processors are configured to support the apparatus in performing corresponding functions of the base station in any method according to any one of the first aspect to the fifth aspect.

In one embodiment, the apparatus may further include one or more memories. The memory is configured to be coupled to the processor, and stores program instructions and/or data necessary for the base station device. The one or more memories may be integrated with the processor, or may be disposed separately from the processor. This is not limited in this application.

When the apparatus is a base station, for example, may be a gNB or a TRP, and the communication unit may be a transceiver or a transceiver circuit. In one embodiment, the transceiver may alternatively be an input/output circuit or an interface.

The apparatus may alternatively be a communication chip. The communication unit may be an input/output circuit or an interface of the communication chip.

In one embodiment, the apparatus includes a transceiver, a processor, and a memory. The processor is configured to control a transceiver or an input/output circuit to receive and send a signal, the memory is configured to store a computer program, and the processor is configured to run the computer program in the memory, so that the apparatus performs the method completed by the base station device in any method according to any one of the first aspect to the fifth aspect.

According to a thirteenth aspect, a communication system is provided. The communication system includes the foregoing terminal device and base station device.

According to a fourteenth aspect, an embodiment of the present disclosure provides a non-volatile computer readable storage medium. The computer readable storage medium is configured to store implementation code of any method according to any one of the first aspect to the fifth aspect.

According to a fifteenth aspect, an embodiment of the present disclosure provides a computer program (product). The computer program (product) includes program instructions, and when executed, the computer program product is used to perform any method according to any one of the first aspect to the fifth aspect.

It may be understood that any one of the foregoing aspects may be implemented together with any one or more of the other aspects, or may be implemented independently.

It can be learned that, according to the embodiments of the present disclosure, the terminal may transmit indication information to the base station in an initial random access procedure, so that the base station can determine a transmit power deviation between a preamble and a PUSCH based on the indication information, thereby completing correct reception and demodulation of the PUSCH. In this way, the initial random access procedure in the related art is improved, and reliability and performance of uplink transmission in initial random access are greatly improved, thereby reducing an access delay of the terminal in radio access, and improving efficiency and reliability of resource transmission in the random access procedure.

BRIEF DESCRIPTION OF DRAWINGS

To describe technical solutions in embodiments of the present disclosure or in the background more clearly, the following briefly describes the accompanying drawings for describing the embodiments of the present disclosure or the background.

DESCRIPTION OF EMBODIMENTS

The following describes embodiments of the present disclosure with reference to the accompanying drawings in the embodiments of the present disclosure. Terms used in the implementations of the present disclosure are merely used to explain specific embodiments of the present disclosure, but are not intended to limit the present disclosure.

Figure 2:
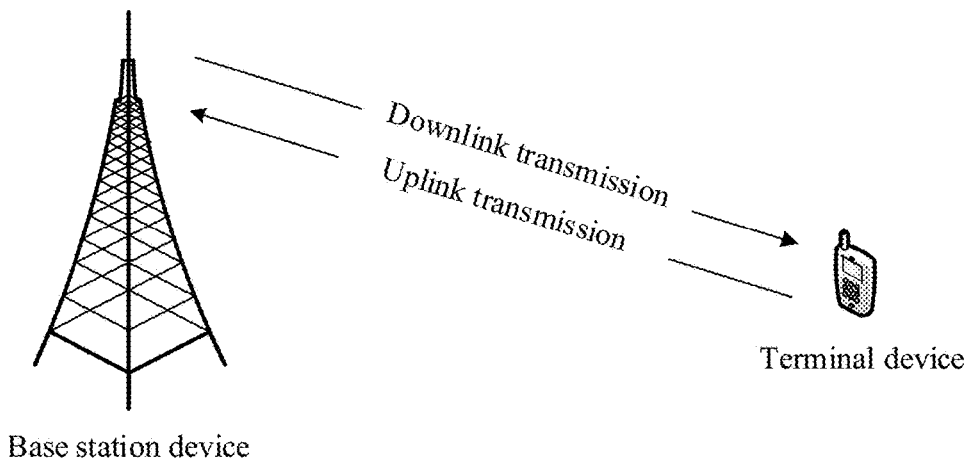
FIG. 2 is a structural diagram of a wireless communication system according to an embodiment of the present disclosure.

First, a system architecture to which the embodiments of the present disclosure are applied is described. Referring to FIG. 2, FIG. 2 is a structural diagram of a wireless communication system according to an embodiment of the present disclosure. The wireless communication system includes at least a base station and a terminal described in the following embodiments. The base station and the terminal may communicate with each other (uplink transmission and downlink transmission) by using an air interface technology. The air interface technology may include existing 2G (for example, Global System for Mobile Communications (GSM)), 3G (for example, UMTS), Wideband Code Division Multiple Access (WCDMA), Time Division-Synchronous Code Division Multiple Access (TD-SCDMA), 4G (for example, FDD LTE and TDD LTE), and a new radio access technology (New RAT) system, for example, future 4.5G and 5G systems.

The base station is a device configured to communicate with the terminal, and the base station may be a Base Transceiver Station (BTS) in GSM or CDMA, or may be an NB (NodeB) in WCDMA, or may be an evolved NodeB (evolved NodeB, eNodeB) in LTE, a relay station, a vehicle-mounted device, an access network device in a future 5G network, an access network device in a future evolved public land mobile network (PLMN) network, or the like.

The terminal is a device configured to communicate with the base station, and the terminal may include a relay in a broad sense. In the present disclosure, a terminal in a general sense is described. The terminal may also be referred to as a mobile station, an access terminal, user equipment, a subscriber unit, a subscriber station, a mobile station, a remote station, a remote terminal, a mobile device, a user terminal, a terminal, a wireless communication device, a user agent, a user apparatus, or the like. The terminal may be a mobile phone, a Session Initiation Protocol (SIP) phone, a wireless local loop (WLL) station, a tablet computer, a personal digital assistant (PDA), user terminal Customer Premise Equipment (CPE), a handheld device with a wireless communication function, a computing device or another processing device connected to a wireless modem, a vehicle-mounted device, a wearable device, a transmission reception point (TRP), a network device (for example, gNB) in a future 5G network, or a device in a future evolved PLMN network. The base station may support communication of a plurality of terminals simultaneously.

Figure 1:
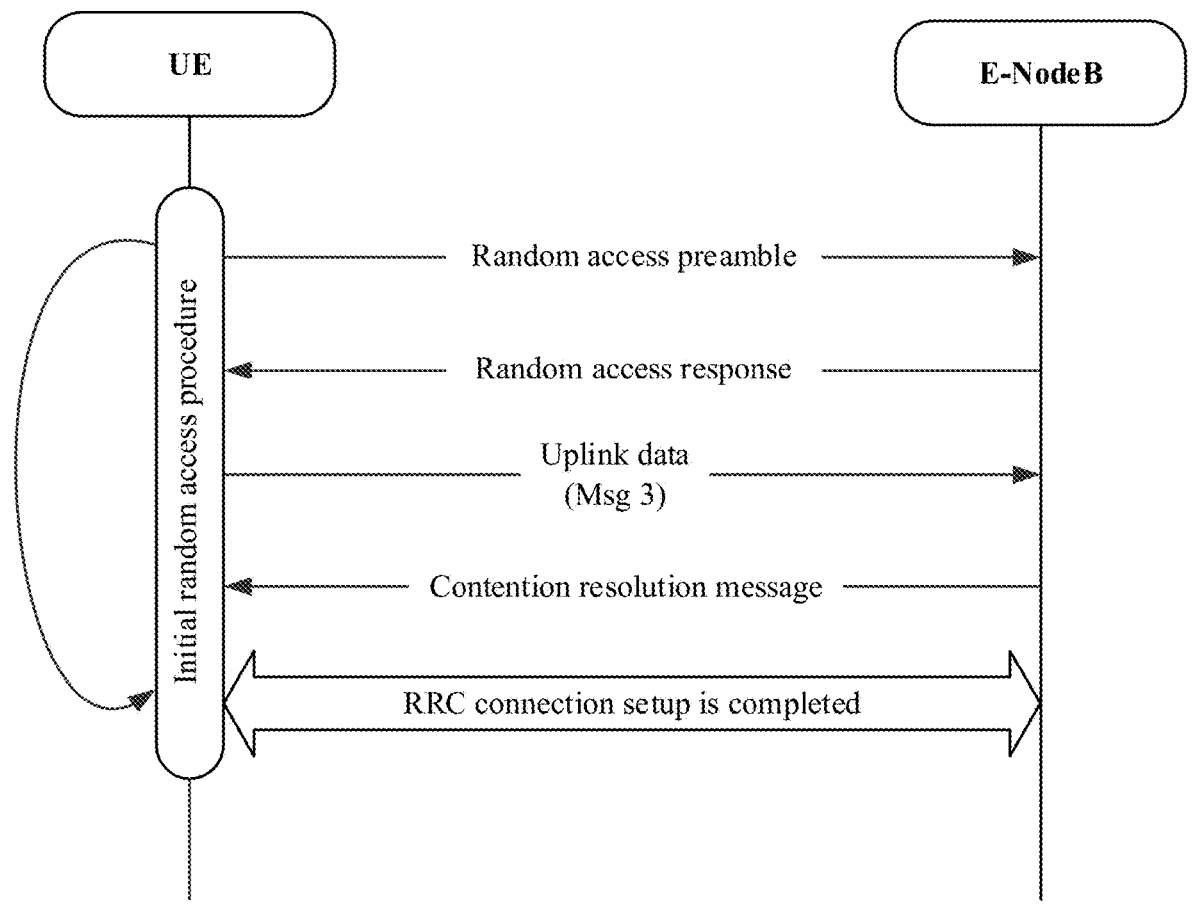
FIG. 1 is a flowchart of a contention-based random access procedure in the related art.
Figure 3:
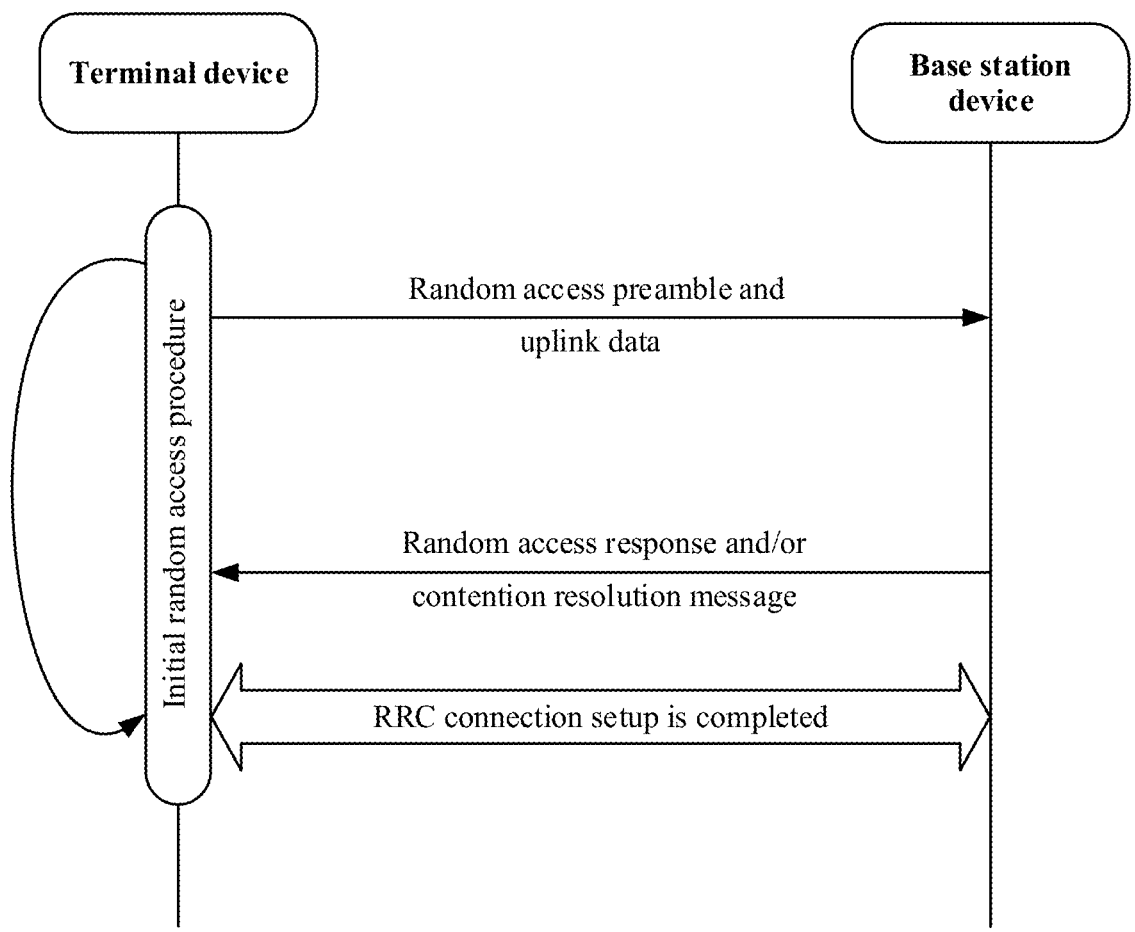
FIG. 3 is a flowchart of a two-operation random access procedure according to an embodiment of the present disclosure.

It should be noted that, the technical solutions in the embodiments of the present disclosure may be applied to an initial random access scenario. The random access scenario may include a scenario of a four-operation random access procedure (for example, as shown in FIG. 1), or may include a scenario of a two-operation random access procedure (for example, as shown in FIG. 3), or may be a scenario of any other variable random access procedure. For ease of description, in the embodiments of the present disclosure, a two-operation random access procedure is mainly used as an example for description. It may be understood that the technical solutions/technical ideas of the present disclosure may alternatively be applied to other random access procedures, and details are not described herein.

The following describes a two-operation random access procedure in an embodiment of the present disclosure. Referring to FIG. 3, FIG. 3 is a flowchart of a possible two-operation random access procedure according to an embodiment of the present disclosure. The procedure mainly includes two operations:

Operation 1: A terminal sends both a random access preamble and an uplink message (Msg3) to a base station. Specifically, in a same communication slot (slot), the terminal sends the preamble and the PUSCH to the base station.

Operation 2: The base station sends corresponding response information to the terminal, where the response information may include a random access response and/or a contention resolution message.

It can be learned that, compared with the related-art procedure shown in FIG. 1, the two-operation random access procedure can reduce an access delay of the terminal in radio access, and improve transmission efficiency in the random access procedure.

In the related-art procedure shown in FIG. 1, the PUSCH and a PRACH use independent and different power control mechanisms, and UE neither reports a path loss value measured by the UE nor reports an actual transmit power value of the UE. In other words, the eNodeB does not know power information of the UE, for example, the path loss value measured by the UE, the actual transmit power of the UE, whether the UE is full power, and a calculated power of the UE.

In the two-operation random access procedure, the PUSCH and the PRACH may be sent simultaneously. For example, the PUSCH and the PRACH may be sent in a same slot. In other words, time division multiplexing or frequency division multiplexing may be performed on the PUSCH and the PRACH in the same slot (for details, refer to the following description), and a random access preamble sent on the PRACH may be multiplexed as a demodulation reference signal of the PUSCH. Therefore, the base station needs to know transmit power information related to the PUSCH and the PRACH of the terminal, so that the base station can correctly demodulate the PUSCH, thereby improving processing performance of the base station.

In addition, in scenarios such as an unlicensed spectrum scenario and a non-orthogonal multiple access (NOMA) scenario in which an access resource is relatively valuable, a radio access resource preempted by the terminal for data transmission is relatively valuable. Resource utilization and resource transmission efficiency can be further improved based on the two-operation random access procedure, and the random access procedure is adapted to large-scale terminal access.

The following describes related power information for sending the preamble and the PUSCH by the terminal.

It should be understood that in this embodiment of the present disclosure, the PRACH is a physical channel used by the terminal to send the random access preamble preamble, and the PUSCH is a physical channel used by the terminal to send to-be-transmitted uplink information. A transmit power of the PRACH may also be referred to as a transmit power or the like of the random access preamble, which falls within the protection scope of the present disclosure.

In this embodiment of the present disclosure, an actual transmit power (the actual transmit power herein may also be referred to as a first transmit power) of the PRACH or the preamble is a smaller value between a maximum transmit power (which may also be referred to as a full power, $P_{max}$) of the terminal and a calculated power (the calculated power herein may also be referred to as a first calculated power). For example, the actual transmit power of the PRACH can be set as shown in the following formula (1):

$$P=\min\{P_{max}, P_L+P_{0,pre}+\Delta_{pre}+(N_{pre}-1)dP_{rampup}\} \quad (1),$$

where $P_{max}$ represents the maximum transmit power of the terminal;

$P_L$ represents a path loss value obtained by the terminal;

$P_{0,pre}$ is a cell-specific parameter, and represents a target receive power of the preamble on the base station side, where a dynamic range is, for example, [−120, −90], and a resolution is 2 dB;

$\Delta_{pre}$ represents a corrected value for different preamble lengths;

$N_{pre}$ represents the number of preambles sent by the UE; and $dP_{rampup}$ represents a Power Ramping operation of cell-specific preamble retransmission, and a possible value is, for example, [0, 2, 4, 6] dB.

In one embodiment, if the terminal sends the preamble to the base station at the foregoing P, but does not receive feedback from the base station, the terminal may increase transmit power to send the preamble again.

In this embodiment of the present disclosure, the actual transmit power of the PUSCH is a smaller value between a maximum transmit power (which may also be referred to as a full power) of the terminal, $P_{CMAX,c}((i))$ and a calculated power (the calculated power herein may also be referred to as a second calculated power). For example, the actual transmit power of the PUSCH may be set as shown in the following formula (2):

$$P_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) + \Delta_{AG}(i) \end{cases}, \quad (2)$$

where $P_{CMAX,c}(i)$ represents the maximum transmit power of the terminal on a carrier c of a primary serving cell;

$M_{PUSCH,c}(i)$ represents the number of scheduling resource blocks of the PUSCH, in the unit of PRB;

$P_{0,PUSCH,c}(j)$ includes $P_{0\_NOMINAL\_PUSCH,c}(j)$ and $P_{0\_UE\_E\_(PUSCH,c)}(j)$, are used to represent a target receive power of the UE, and are semi-statically configured by using higher layer RRC signaling, where $P_{0\_NOMINAL\_PUSCH,c}(j)$ is a cell-specific parameter and is semi-statically configured by using RRC signaling;

$\alpha_c(j)$ represents a path loss compensation factor, is a cell-specific parameter, and is semi-statically configured by the higher layer RRC signaling.

$PL_c$ is a path loss measurement value of the UE based on reference signal received power (Reference Signal Received Power, RSRP for short);

$\Delta_{TF,c}(i)=10 \log_{10}((2^{BPRE \cdot K}-1) \cdot B_{offset}^{PUSCH})$ represents a power adjustment value for different modulation and coding schemes, is a cell-specific parameter, and is semi-statically configured by the higher layer RRC signaling; and $f_c(i)$ represents a closed-loop power adjustment value, and represents a feedback value quantized by a receive end based on a receive/measurement error.

In one embodiment, the terminal sends the PUSCH to the base station at the foregoing $P_{PUSCH,c}(i)$.

To ensure the two-operation random access procedure to be implemented, in this embodiment of the present disclosure, the two-operation random access procedure is further improved, to improve transmission reliability and performance in the two-operation random access procedure, so that the random access procedure is adapted to scenario requirements such as low delay, high reliability, and large-scale terminal access.

The following separately describes some specific improvement solutions in the embodiments of the present disclosure based on the embodiments in FIG. 4, FIG. 5, FIG. 7, FIG. 8, FIG. 10, and FIG. 11.

Figure 4:
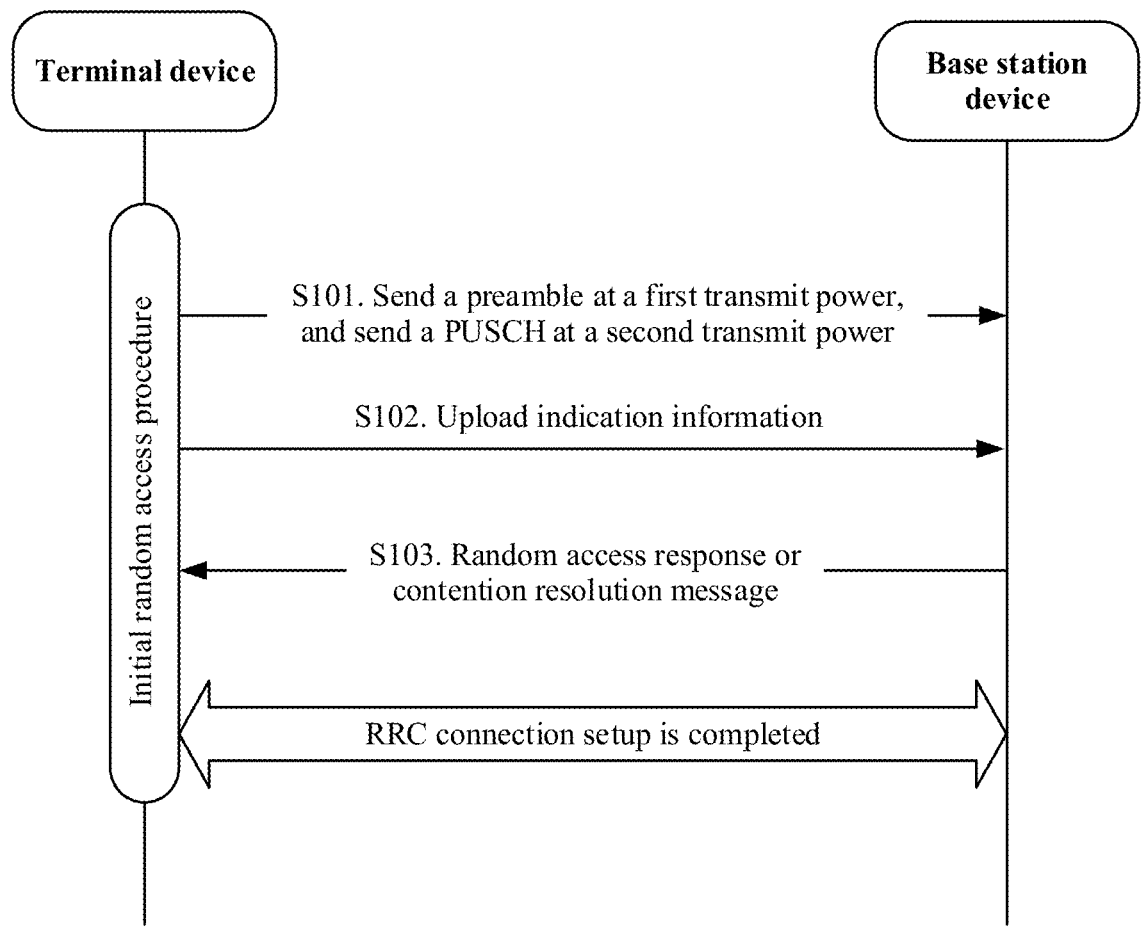
FIG. 4 is a flowchart of a transmission method according to an embodiment of the present disclosure.

Referring to FIG. 4, FIG. 4 is a flowchart of a transmission method according to an embodiment of the present disclosure. The method is described from a terminal side and a base station side. The method includes but is not limited to the following operations.

Operation 101: A terminal sends a preamble at a first transmit power, and sends a PUSCH at a second transmit power. Correspondingly, a base station receives the preamble and the PUSCH.

In one embodiment, in a case of time division multiplexing on the preamble and the PUSCH, the terminal may separately send the preamble at the first transmit power and send the PUSCH at the second transmit power on different symbols in a same slot.

In one embodiment, in a case of frequency division multiplexing on the preamble and the PUSCH, the terminal may need to perform power scaling processing, to ensure that a sum of the first transmit power and the second transmit power is less than or equal to a maximum transmit power of the terminal. Then, on a same symbol in the same slot, the preamble may be sent at the first transmit power, and the PUSCH may be sent at the second transmit power separately. For specific implementation of this case, refer to related descriptions in the embodiment in FIG. 11 below. Details are not described herein.

For a slot in the time division multiplexing or the frequency division multiplexing, for example, in a system frame structure, a 10 ms frame is divided into two 5 ms half-frames, and each half-frame includes four data subframes and one special subframe. Each subframe is divided into two 0.5 ms slots, and each slot is further divided into seven OFDM symbols. For another example, the slot may alternatively be a time interval TTI and/or a time unit and/or a subframe and/or a mini-slot for signal transmission in a subcarrier spacing.

In this embodiment of the present disclosure, a PRACH (Physical random access Channel) is a physical random access channel, a mapping relationship is formed between the PRACH and the random access preamble (Preamble), and the PRACH is a channel used to transmit the preamble.

The PUSCH is a physical uplink shared channel. The PUSCH may be used to transmit uplink data of a UL-SCH. In one embodiment, the terminal may send PUSCH data on an uplink resource notified or specified by the base station, or on an uplink resource defined by the terminal.

Operation 102: The terminal indicates a power deviation between the first transmit power and the second transmit power to the base station by using indication information. In other words, the indication information is used to enable the base station to determine the power deviation between the first transmit power and the second transmit power. Correspondingly, the base station obtains the indication information.

It should be noted that there is no necessary order between operation 102 and operation 101.

For example, in one embodiment, the terminal adds the indication information to the PRACH or the PUSCH and transmits the indication information to the base station. In this case, operation 102 and operation 101 may be combined into a same operation.

For another example, In one embodiment, the terminal sends the indication information to the base station by using a communication channel independent of the PRACH and the PUSCH. In this case, operation 102 may be performed after S101, or may be performed before operation 101, or operation 102 and operation 101 may be performed simultaneously.

In one embodiment, the indication information is specifically used to indicate an attribute of the first transmit power and an attribute of the second transmit power. The attribute of the first transmit power is a maximum transmit power of the terminal or a first calculated power of the preamble; and the attribute of the second transmit power is the maximum transmit power of the terminal or a second calculated power of the PUSCH. In other words, in this case, the terminal indicates, to the base station by using the indication information, that power usage states of the PUSCH and the preamble are respectively a full power or a calculated actual power. A possible power usage state combination formed by the power usage states includes at least one of the following combinations:

{PRACH_max, PUSCH_max}, {PRACH_required, PUSCH_required}, {PRACH_max, PUSCH_required}, and {PRACH_required, PUSCH_max}, where PUSCH_required represents a power state in which a power used for sending the PUSCH is actually obtained through calculation based on the formula (2);

PRACH_required represents a power state in which a power used for sending the preamble is actually obtained through calculation based on the formula (1);

PUSCH_max represents a power state in which a power used for sending the PUSCH is a full power (namely, the maximum transmit power of the terminal); and PRACH_max represents a power state in which a power used for sending the preamble is a full power (namely, the maximum transmit power of the terminal).

In one embodiment, the indication information is specifically used to indicate a quantized value of a difference between the first transmit power and the second transmit power. In other words, in this case, the terminal can directly report an index of a power difference between the PUSCH and the preamble. The power difference herein is, for example, a quantized power deviation value predefined between the base station and the terminal. For example, candidate values of the quantized power deviation may be {−3, −2, −1, 0, +1, +2, +3, +4}, and corresponding reported indexes may be 0, 1, 2, 3, 4, 5, 6, and 7 respectively. The base station derives a power deviation value between the first transmit power and the second transmit power based on a mapping relationship between the reported indexes and corresponding candidate values of the power deviation.

It should be noted that the foregoing examples are merely used to explain the present disclosure, but not intended to limit the present disclosure.

S103. The base station sends a random access response and/or a contention resolution message to the terminal.

In one embodiment, when the random access procedure described in this embodiment belongs to a contention-based random access procedure, the base station generates a random access response, and the random access response is used as a response to the preamble. The base station generates a contention resolution message, and the contention resolution message is used to notify the terminal that the terminal can be accessed. Then, the base station sends the random access response and the contention resolution message to the terminal in a same slot.

In one embodiment, when the random access procedure described in this embodiment belongs to a non-contention-based random access procedure, the base station generates a random access response, and the random access response is used as a response to the preamble. Then, the base station sends the random access response to the terminal.

It should be noted that the random access response and/or the contention resolution message in this embodiment of the present disclosure may be different from the random access response and/or the contention resolution message in the related art. For example, the random access response in this embodiment of the present disclosure may not include uplink resource location indication information and a temporary C-RNTI that are allocated to the terminal.

It can be learned that, in this embodiment of the present disclosure, the terminal transmits the indication information to the base station in a two-operation random access procedure, so that the base station can determine a transmit power deviation between the preamble and the PUSCH based on the indication information, thereby completing correct reception and demodulation of the PUSCH. In this way, reliability and performance of uplink transmission in the two-operation random access procedure can be greatly improved, and it is ensured that the two-operation random access procedure is implemented successfully, thereby reducing an access delay of the terminal in radio access, and improving efficiency and reliability of resource transmission in the random access procedure.

Figure 5:
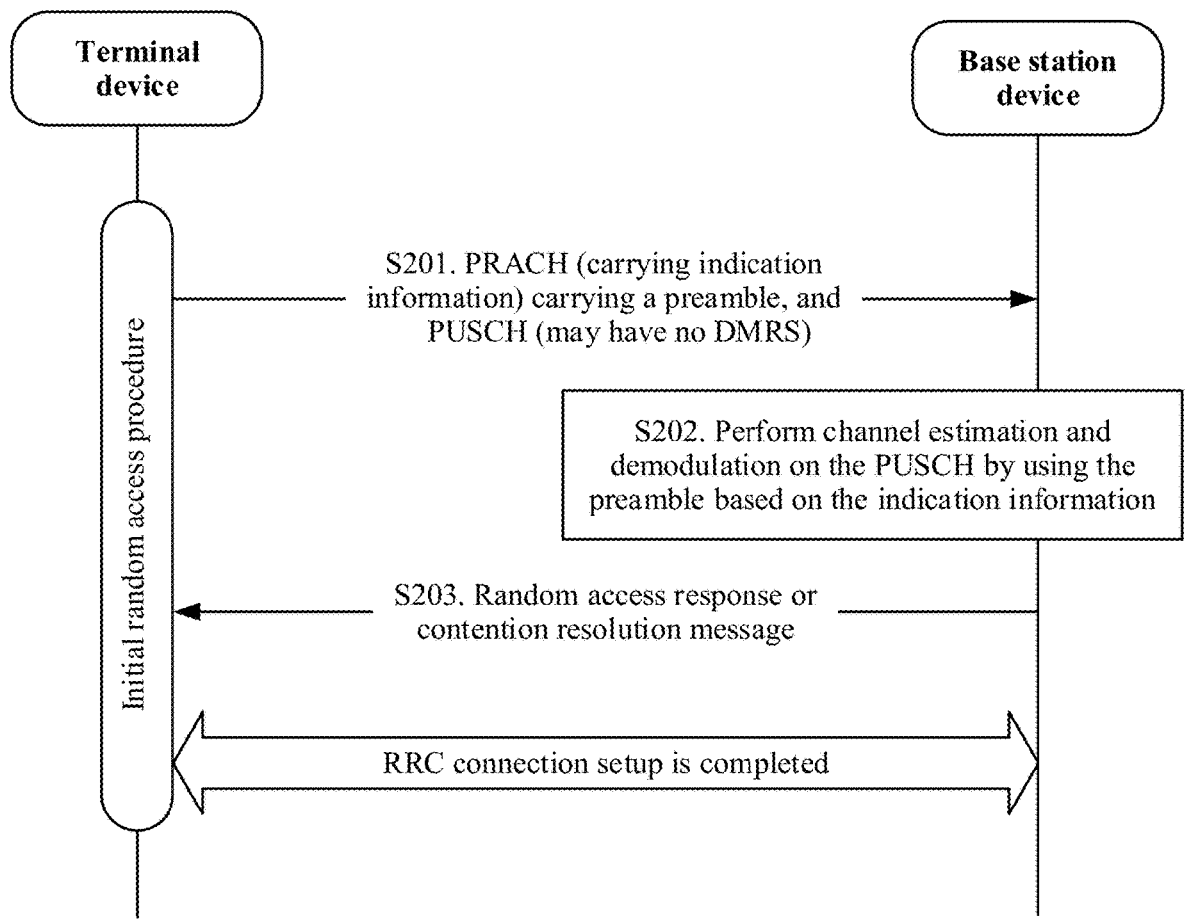
FIG. 5 is a flowchart of still another transmission method according to an embodiment of the present disclosure.

Referring to FIG. 5, FIG. 5 is a flowchart of another transmission method according to an embodiment of the present disclosure. The method is described from a terminal side and a base station side. The method includes but is not limited to the following operations.

Operation 201: A terminal sends, at a first transmit power, a random access preamble preamble carried in a PRACH, and sends a PUSCH at a second transmit power. Correspondingly, a base station receives the random access preamble preamble carried on the PRACH and the PUSCH.

The preamble is used as a demodulation reference signal (DMRS) of the PUSCH.

In addition, the PRACH or the PUSCH is further used to carry indication information, and the indication information is used to enable the base station to determine a power deviation between the first transmit power and the second transmit power.

For example, in a possible embodiment, the random access preamble carries the indication information. In other words, the indication is carried by using different preambles. In another possible embodiment, the indication information may be carried on a time domain resource and/or a frequency domain resource corresponding to the random access preamble. In still another possible embodiment, the indication information may be carried on a PUSCH resource (uplink data).

In one embodiment, the indication information is specifically used to indicate an attribute of the first transmit power and an attribute of the second transmit power. The attribute of the first transmit power is a maximum transmit power of the terminal or a first calculated power of the preamble; and the attribute of the second transmit power is the maximum transmit power of the terminal or a second calculated power of the PUSCH. In this case, the terminal indicates, to the base station by using the indication information, that power usage states of the PUSCH and the preamble/PRACH are respectively a full power or a calculated actual power. A possible power usage state combination formed by the power usage states includes at least one of the following combinations: {PRACH_max, PUSCH_max}, {PRACH_required, PUSCH_required}, {PRACH_max, PUSCH_required}, and {PRACH_required, PUSCH_max}.

In this case, the indication information may be indicated in one or more of the following manners: The indication information is indicated by a mapping relationship corresponding to the indication information and a time domain resource of the preamble; the indication information is indicated by a mapping relationship corresponding to the indication information and a frequency domain resource of the preamble; or the indication information is indicated by a mapping relationship corresponding to the indication information and the random access preamble.

In other words, the terminal may establish a mapping relationship between a time domain resource, and/or a frequency domain resource, and/or a preamble corresponding to the PRACH and a power usage state combination, and indicate the power usage state combination to the base station by using the mapping relationship.

Figure 6:
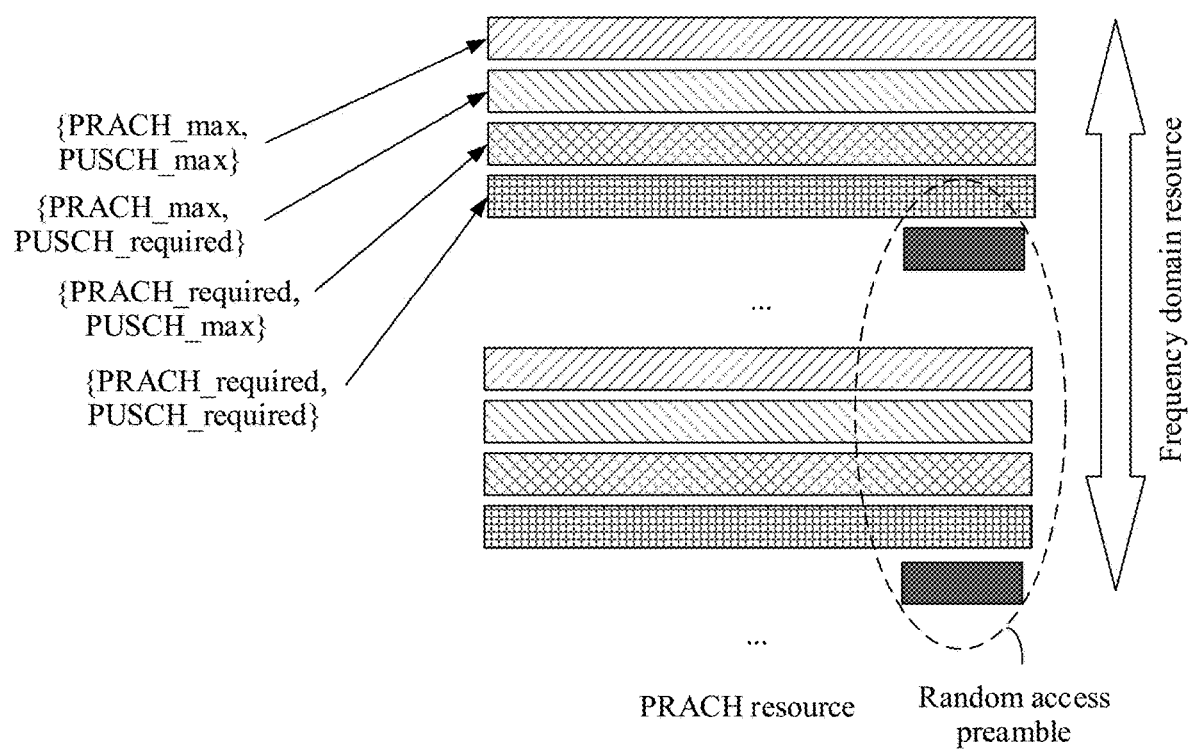
FIG. 6 is a diagram of a scenario of establishing a mapping relationship between a frequency domain resource corresponding to a preamble and a power usage state combination according to an embodiment of the present disclosure.

For example, referring to FIG. 6, FIG. 6 shows a scenario of establishing a mapping relationship between a frequency domain resource corresponding to a PRACH and a power usage state combination. As shown in FIG. 6, in the frequency domain resource corresponding to the PRACH, one power usage state combination corresponds to a frequency domain resource of one PRACH (different frequency domain resources in the figure may be represented by using different rectangular patterns), so that {PRACH_max, PUSCH_max}, {PRACH_required, PUSCH_required}, {PRACH_max, PUSCH_required}, and {PRACH_required, PUSCH_max} may be mapped to frequency domain resources corresponding to different PRACHs. In this way, after receiving the preamble, the base station may determine, based on the frequency domain resource corresponding to the PRACH used by the terminal to transmit the preamble, power usage states of the PUSCH and the preamble, to obtain a power deviation value between the PUSCH and the preamble, and may further receive and demodulate the PUSCH based on the preamble.

For another example, similarly, a mapping relationship between the time domain resource corresponding to the preamble and the power usage state combination may be established. Specifically, one power usage state combination may be set to correspond to the time domain resource of one PRACH, so that {PRACH_max, PUSCH_max}, {PRACH_required, PUSCH_required}, and {PRACH_max, PUSCH_required}, and {PRACH_required, PUSCH_max} may be mapped to time domain resources corresponding to different PRACHs. In this way, after receiving the preamble, the base station may determine respective power usage states of the PUSCH and the preamble based on a time (namely, time domain resource) for transmitting the preamble by the terminal, to obtain a power deviation value between the PUSCH and the preamble, and may further receive and demodulate the PUSCH based on the preamble.

For another example, a mapping relationship between the preamble and the power usage state combination may be further predefined. For example, different preamble codes correspond to different power usage state combinations. In this way, after receiving the preamble, the base station may determine respective power usage states of the PUSCH and the preamble based on a preamble code transmitted by the terminal, to obtain a power deviation value between the PUSCH and the preamble, and may further receive and demodulate the PUSCH based on the preamble.

In one embodiment, the indication information is specifically used to indicate a quantized value of a difference between the first transmit power and the second transmit power. In other words, in this case, the terminal can directly report an index of a power difference between the PUSCH and the preamble. The power difference herein is, for example, a quantized power deviation value predefined between the base station and the terminal. For example, candidate values of the quantized power deviation may be {−3, −2, −1, 0, +1, +2, +3, +4}, and corresponding reported indexes may be 0, 1, 2, 3, 4, 5, 6, and 7 respectively. The base station derives a power deviation value between the first transmit power and the second transmit power based on a mapping relationship between the reported indexes and corresponding candidate values of the power deviation.

In this case, the indication information may also be indicated in one or more of the following manners: The indication information is indicated by a mapping relationship corresponding to the indication information and a time domain resource of the PRACH; the indication information is indicated by a mapping relationship corresponding to the indication information and frequency domain resource of the PRACH; or the indication information is indicated by a mapping relationship corresponding to the indication information and the random access preamble.

In other words, the terminal may establish a mapping relationship between a time domain resource, or a frequency domain resource, or a preamble code of the PRACH and a quantized power deviation value, and indicate the quantized power deviation value to the base station by using the mapping relationship.

For example, a mapping relationship between the frequency domain resource corresponding to the PRACH and the quantized power deviation value may be established. One quantized power deviation value corresponds to a frequency domain resource of one PRACH, so that different power deviation values may be mapped to frequency domain resources corresponding to different PRACHs. In this way, after receiving the preamble, the base station may determine a quantized power deviation value between the PUSCH and the preamble based on the frequency domain resource used by the terminal to transmit the preamble, and further obtain a difference between the first transmit power and the second transmit power.

For another example, similarly, a mapping relationship between the time domain resource corresponding to the PRACH and the quantized power deviation value may be established. Specifically, one quantized power deviation value may be set to correspond to the time domain resource of one PRACH, so that different quantized power deviation values may be mapped to time domain resources corresponding to different PRACHs. In this way, after receiving the preamble, the base station may determine a quantized power deviation value between the PUSCH and the preamble based on a time (namely, a time domain resource) for transmitting the preamble by the terminal, and further obtain a difference between the first transmit power and the second transmit power.

For another example, similarly, a mapping relationship between the time domain and frequency domain resource corresponding to the PRACH and the quantized power deviation value may be established. Specifically, one quantized power deviation value may be set to correspond to the time domain and frequency domain resource of one PRACH, so that different quantized power deviation values may be mapped to time domain and frequency domain resources corresponding to different PRACHs. In this way, after receiving the preamble, the base station may determine a quantized power deviation value between the PUSCH and the preamble based on a time (namely, a time domain resource) and a frequency (namely, a frequency domain resource) for transmitting the preamble by the terminal, and further obtain a difference between the first transmit power and the second transmit power.

For another example, a mapping relationship between the preamble and the quantized power deviation value may be further predefined. For example, different preamble codes correspond to different quantized power deviation values. In this way, after receiving a preamble code transmitted by the terminal, the base station may determine a quantized power deviation value between the PUSCH and the preamble, and further obtain a difference between the first transmit power and the second transmit power.

Operation 202: The base station performs channel estimation and demodulation on the PUSCH by using the random access preamble based on the indication information.

Specifically, the preamble is used as a demodulation reference signal when the base station receives uplink data (PUSCH data). Because there is a power difference between the PUSCH and the preamble, the base station cannot directly perform channel estimation and uplink data demodulation on the PUSCH by using the random access preamble, but first determines a power deviation between the PUSCH and the preamble by using the indication information, and then performs channel estimation and uplink data demodulation on the PUSCH by using the random access preamble based on the power deviation.

Operation 203: The base station sends a random access response and/or a contention resolution message to the terminal. For a specific implementation of this operation, refer to related descriptions of operation 103 in the embodiment in FIG. 4. Details are not described herein again.

In one embodiment, after an RRC connection succeeds, the terminal may alternatively report a power headroom report (PHR) value of the terminal to the base station, so that the base station derives a path loss value of the terminal by using the PHR reported by the terminal and a full power.

It can be learned that, in this embodiment of the present disclosure, the random access preamble (Preamble) is used as a Msg3, namely, a demodulation reference signal of the PUSCH. When sending the preamble and the PUSCH, the terminal sends, to the base station, indication information used to indicate the transmit power deviation. In this way, the base station can successfully demodulate uplink data of the PUSCH by using the preamble based on the power deviation. In a future communication protocol (for example, 5G) scenario, a radio resource preempted by the terminal for data transmission is relatively valuable. Therefore, implementing the technical solutions of the present disclosure can improve radio resource utilization and meet a scenario requirement of large-scale terminal access.

Figure 7:
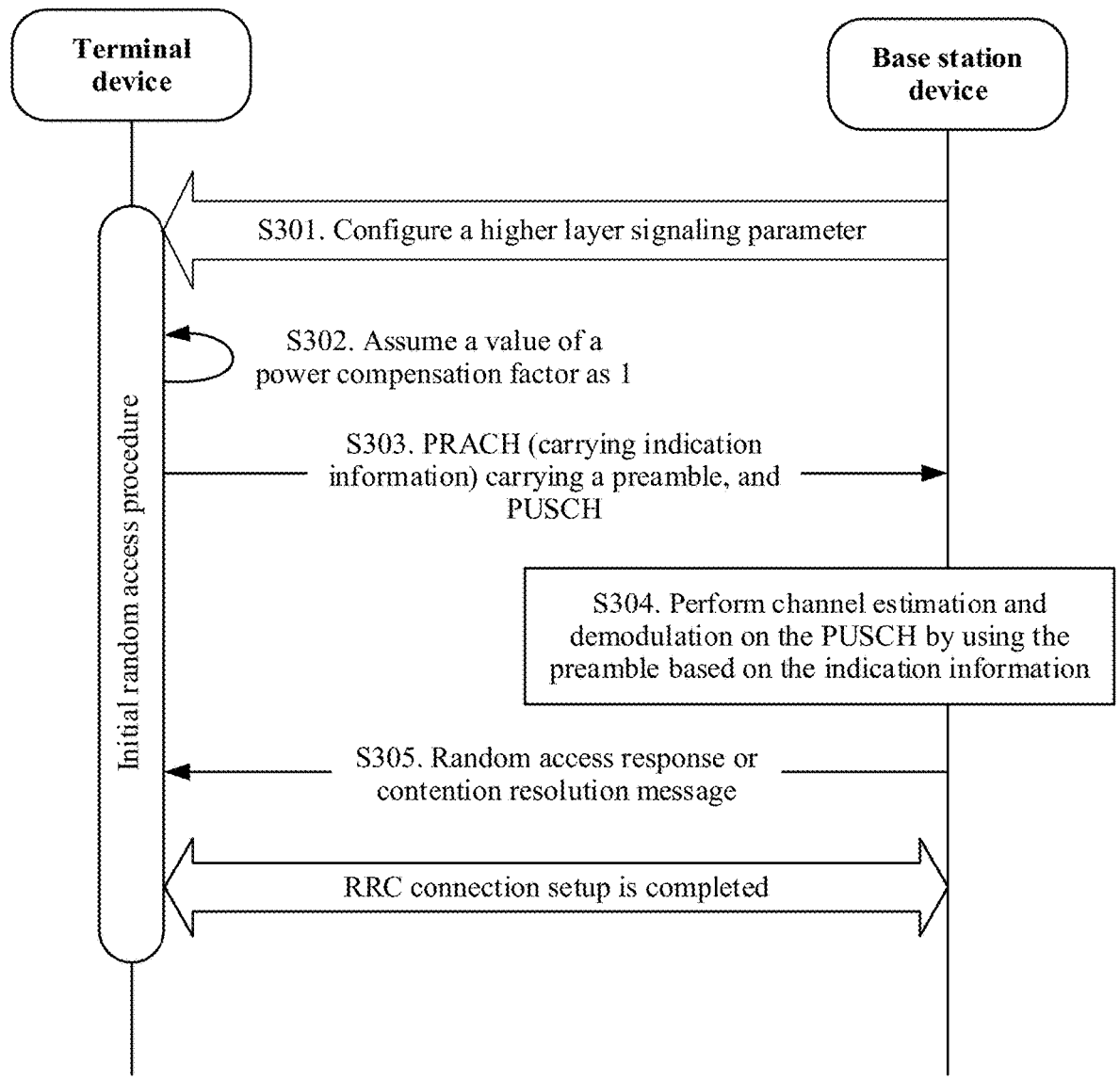
FIG. 7 is a flowchart of still another transmission method according to an embodiment of the present disclosure.

Referring to FIG. 7, FIG. 7 is a flowchart of still another transmission method according to an embodiment of the present disclosure. The method is described from a terminal side and a base station side. The method includes but is not limited to the following operations.

Operation 301: A base station configures a higher layer signaling parameter for a terminal.

For example, for a preamble, higher layer signaling parameters of the preamble that are configured by the base station for the terminal include but are not limited to, $P_{0,pre}$, $\Delta_{pre}$, $dP_{rampup}$, and the like.

For another example, for a PUSCH, higher layer signaling parameters of the PUSCH that are configured by the base station for the terminal include but are not limited to: $\Delta_{TF,c}$ (i), $P_{0\_PUSCH,c}(j)$, and a (j). A candidate value of a path loss compensation factor $\alpha_c(j)$ configured by the base station for the terminal is a real number between [0, 1]. For example, the value is one of 0, 0.1, 0.2, 0.3, 0.4, 0.5, 0.6, 0.7, 0.8, 0.9, and 1.0.

Operation 302: The terminal assumes (or sets) a value of the power compensation factor as 1.

In one embodiment, when the terminal determines that a current random access procedure is two-operation random access, namely, when the preamble and the PUSCH need to be transmitted in a same slot, the terminal assumes the value of the power compensation factor $\alpha_c(j)$ of the PUSCH as 1 by default.

It may be understood that, in another specific implementation, when the terminal supports both two-operation random access and conventional four-operation random access, the terminal is also allowed to switch between two random access procedures in this embodiment of the present disclosure. In this case, in a two-operation random access scenario, the terminal assumes the value of the power compensation factor $\alpha_c(j)$ of the PUSCH as 1. In a conventional four-operation random access scenario, the terminal configures the power compensation factor of the PUSCH for the terminal by using higher layer signaling, and a candidate value of the configured power compensation factor of the PUSCH may be a real number between [0, 1].

For example, in a two-operation random access scenario, the terminal may first determine whether the value of the power compensation factor configured by the base station for the terminal by using higher layer signaling is 1. If the value is not 1, the terminal assumes the value of $\alpha_c(j)$ as 1, and then calculates a transmit power of the PUSCH.

For example, in another two-operation random access scenario, the terminal may alternatively directly assign 1 to $\alpha_c(j)$ in a process of calculating a transmit power of the PUSCH.

Specifically, a calculated power (namely, a first calculated power) of the preamble may be determined based on at least one of the higher layer signaling parameters $P_{0,pre}$, $\Delta_{pre}$, $dP_{rampup}$, and $N_{pre}$ of the preamble that are configured by the base station, and a path loss value $P_L$ measured by the terminal. For a specific calculation process, refer to the description of the calculated power provided in the foregoing formula (1). Details are not described herein again.

Specifically, a calculated power (namely, a second calculated power) of the PUSCH may be determined based on at least one of the higher layer signaling parameters $\Delta_{TF,c}$ (i), $P_{0\_PUSCH,c}(j)$, and $\alpha_c(j)$ of the PUSCH configured by the base station, and a path loss value $PL_c$ measured by the terminal. For a specific calculation process, refer to the description of the calculated power provided in the foregoing formula (2). Details are not described herein again.

Operation 303: The terminal sends, at a first transmit power, a random access preamble carried in a PRACH, and sends a PUSCH at a second transmit power. Correspondingly, the base station receives the PRACH that carries the random access preamble and the PUSCH. The random access preamble is used as a demodulation reference signal (Demodulation RS, DMRS) of the PUSCH. In addition, the PRACH or the PUSCH is further used to carry indication information, and the indication information is used to enable the base station to determine a power deviation between the first transmit power and the second transmit power.

For a specific implementation of this operation, refer to detailed descriptions of operation 201 in the embodiment in FIG. 5. For brevity of this specification, details are not described herein again.

Operation 304: The base station performs channel estimation and demodulation on the PUSCH by using the random access preamble based on the indication information.

Specifically, the base station determines a power deviation between the PUSCH and the preamble by using the indication information, and then performs channel estimation and uplink data demodulation on the PUSCH by using the random access preamble based on the power deviation.

In some embodiments, the indication information is used to indicate power usage states of the PUSCH and the PRACH/preamble. A possible power usage state combination formed by the power usage states includes at least one of the following combinations: {PRACH_max, PUSCH_max}, {PRACH_required, PUSCH_required}, {PRACH_max, PUSCH_required}, and {PRACH_required, PUSCH_max}.

Therefore, for example, if a power usage state combination currently obtained by the base station is {PRACH_max, PUSCH_max}, the base station directly determines that the power deviation between the PUSCH and the preamble is 0.

For another example, if the power usage state combination currently obtained by the base station is {PRACH_required, PUSCH_required}, and the terminal does not report the path loss value to the base station, the base station may also assume the value of the power compensation factor $\alpha_c(j)$ as 1, and eliminates a difference between the preamble and the PUSCH in the power compensation factor (namely, a difference between the path loss value $P_L$ of the PRACH and the path loss value $\alpha_c(j)*PL_c$ of the PUSCH), so that a calculated power difference between the PUSCH and the preamble may be calculated based on the higher layer signaling parameter of the preamble and the higher layer signaling parameter of the PUSCH.

For another example, if the power usage state combination currently obtained by the base station is {PRACH_max, PUSCH_required}, although the calculated power PRACH_required of the preamble is greater than or equal to the maximum transmit power PRACH_max of the terminal, for simplicity, the maximum transmit power may be approximately replaced with the calculated power PRACH_required of the preamble, so that the power deviation value between the PUSCH and the preamble may be calculated based on the same processing manner as the foregoing state combination.

For another example, if the power usage state combination currently obtained by the base station is {PRACH_required, PUSCH_max}, although the calculated power of the PUSCH is greater than or equal to the maximum transmit power of the terminal, for simplicity, the maximum transmit power PUSCH_max may be approximately replaced with the calculated power PUSCH_required of the PUSCH, so that the power deviation value between the PUSCH and the preamble may be calculated based on the same processing manner as the foregoing state combination.

Operation 305: The base station sends a random access response and/or a contention resolution message to the terminal. For a specific implementation of this operation, refer to related descriptions of operation 103 in the embodiment in FIG. 4. Details are not described herein again.

In one embodiment, after the RRC connection succeeds, the terminal may also report a power headroom report (Power Headroom Report, PHR) value of the terminal to the base station, so that the base station derives the path loss value of the terminal by using the PHR reported by the terminal and the maximum transmit power.

It can be learned that, in this embodiment of the present disclosure, the random access preamble is used as a Msg3, namely, the demodulation reference signal of the PUSCH, and the terminal assumes the value of the power compensation factor as 1. When sending the preamble and the PUSCH, the terminal sends, to the base station, indication information used to indicate the power usage states of the PUSCH and the preamble. In this way, the base station can determine whether transmit powers of the PUSCH and the preamble of the terminal are respectively a calculated power or a full power, and can also calculate a power deviation between the transmit powers of the PUSCH and the preamble, so that uplink data of the PUSCH can be successfully demodulated by using the preamble. Therefore, implementing the technical solutions of the present disclosure can improve radio resource utilization, meet a scenario requirement of large-scale terminal access, and improve reliability of the two-operation random access procedure.

Figure 8:
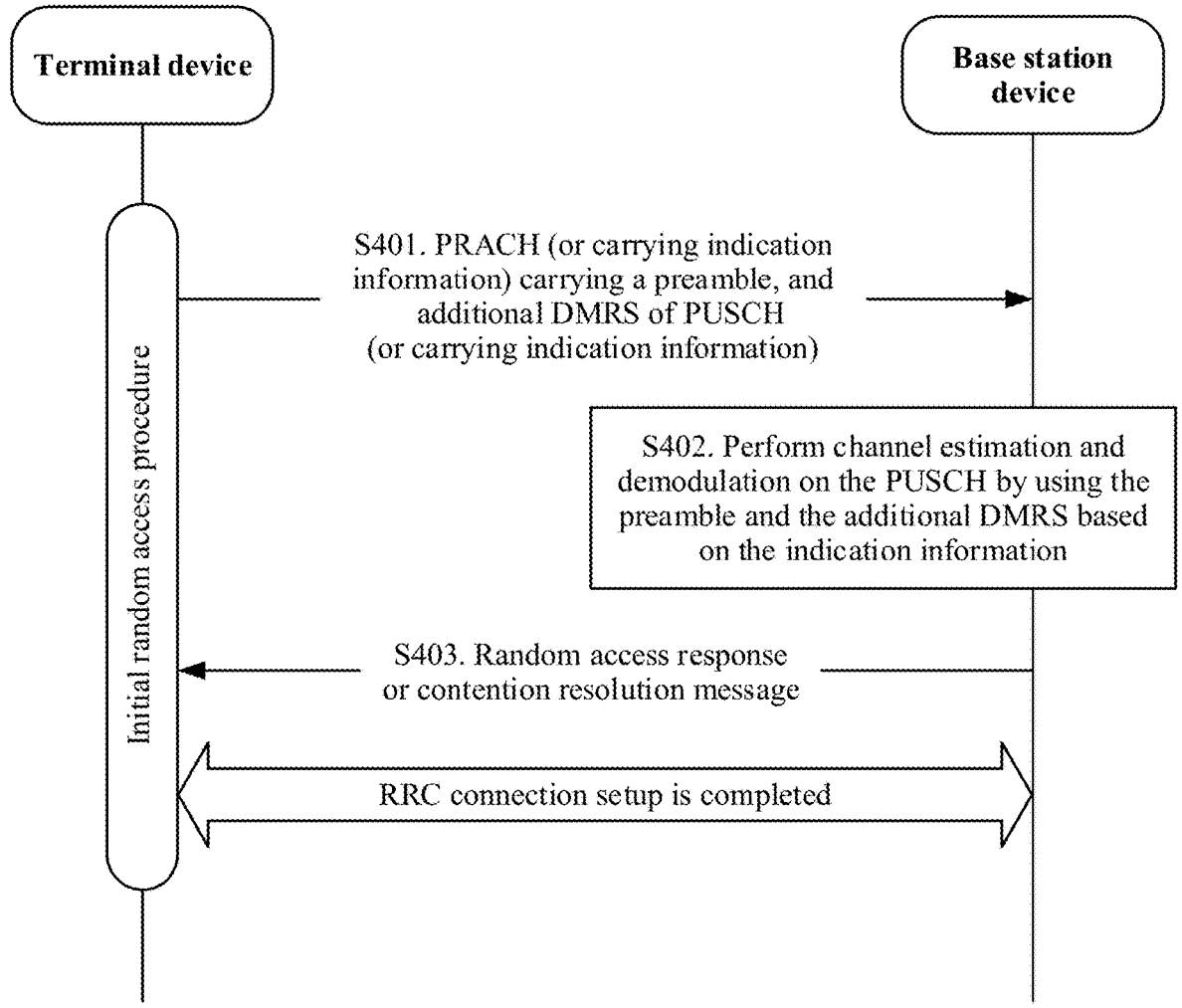
FIG. 8 is a flowchart of still another transmission method according to an embodiment of the present disclosure.

Referring to FIG. 8, FIG. 8 is a flowchart of a transmission method according to an embodiment of the present disclosure. The method is described from a terminal side and a base station side. A main difference between the method and the method described in the embodiment in FIG. 5 lies in: In the embodiment in FIG. 5, only the random access preamble is used as a DMRS; but in the method, the random access preamble is used as a front-loaded DMRS. In addition, a demodulation reference signal of the PUSCH further includes low-density additional DMRSs. The low-density herein means that a density of DMRSs of the PUSCH in the method is lower than that of DMRSs of the PUSCH in the related art. Specifically, the method includes but is not limited to the following operations.

Operation 401: A terminal sends, at a first transmit power, a random access preamble carried on a PRACH, and sends a PUSCH at a second transmit power. Correspondingly, a base station receives the random access preamble and the PUSCH.

The random access preamble is used as a front-loaded demodulation reference signal of the PUSCH; and the demodulation reference signal of the PUSCH further includes an additional demodulation reference signal of the PUSCH. The front-loaded demodulation reference signal and the additional demodulation reference signal are jointly used for demodulation of the PUSCH.

In addition, the PRACH/preamble or the PUSCH is further used to carry indication information, and the indication information is used to enable the base station to determine a power deviation between the first transmit power and the second transmit power. In one embodiment, the indication information is used to indicate an attribute of the first transmit power and an attribute of the second transmit power (namely, respective power usage states of the PRACH/preamble and the PUSCH). In one embodiment, the indication information may be used to indicate a quantized value of a difference between the first transmit power and the second transmit power. For a related specific implementation, refer to related descriptions of operation 201 in the embodiment in FIG. 5. For brevity of this specification, details are not described herein again.

When the indication information is carried in the preamble or the PRACH, the indication information is indicated by the terminal in one or more of the following manners: The indication information is indicated by a mapping relationship corresponding to the indication information and a time domain resource of the PRACH; the indication information is indicated by a mapping relationship corresponding to the indication information and a frequency domain resource of the PRACH; or the indication information is indicated by a mapping relationship corresponding to the indication information and a code resource of the preamble. For a related specific implementation, refer to related descriptions of operation 201 in the embodiment in FIG. 5. For brevity of this specification, details are not described herein again.

When the indication information is carried in the PUSCH, the indication information is indicated by the terminal in one or more of the following manners: The indication information is indicated by a mapping relationship corresponding to the indication information and a time domain resource of the PUSCH; the indication information is indicated by a mapping relationship corresponding to the indication information and a frequency domain resource of the PUSCH; or the indication information is indicated by a mapping relationship corresponding to the indication information and an additional demodulation reference signal sequence of the PUSCH.

In other words, when the indication information indicates the respective power usage states of the PRACH/preamble and the PUSCH, the terminal may establish a mapping relationship between a time domain resource, and/or a frequency domain resource of the PUSCH, or a DMRS sequence of the PUSCH and a power usage state combination, and indicate the power usage state combination to the base station by using the mapping relationship.

Figure 9:
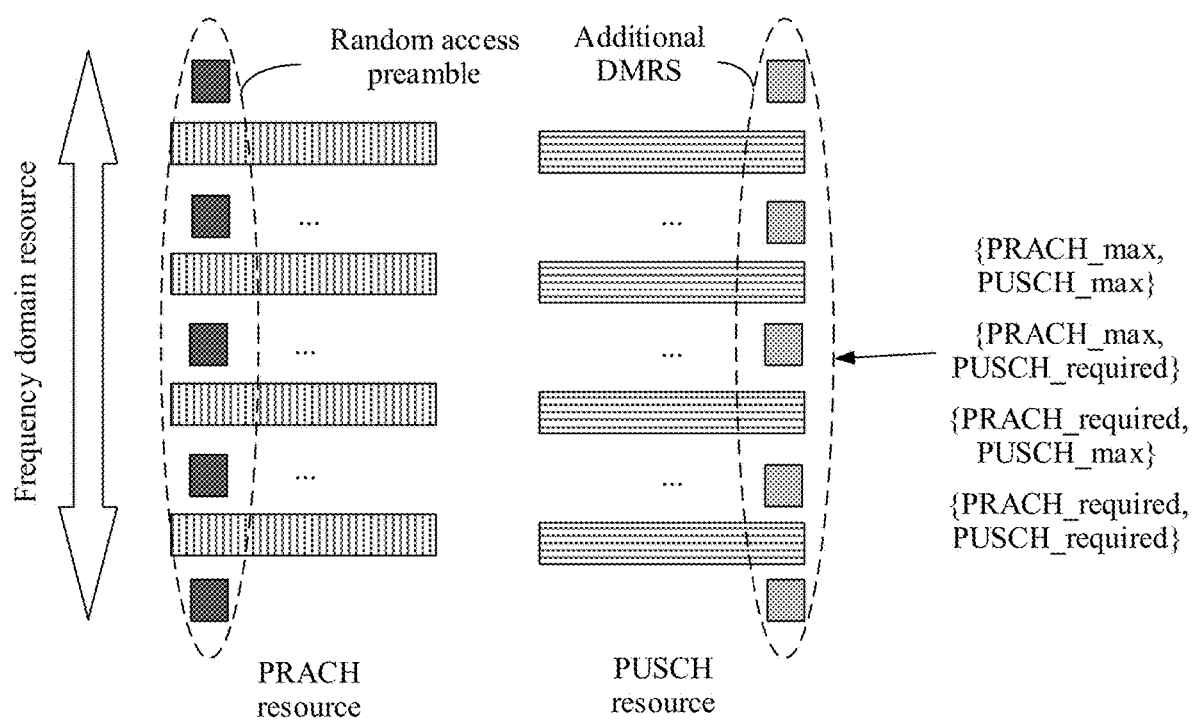
FIG. 9 is a diagram of a scenario of establishing a mapping relationship between a DMRS sequence of a PUSCH and a power usage state combination according to an embodiment of the present disclosure.

For example, referring to FIG. 9, FIG. 9 shows a scenario of establishing a mapping relationship between a DMRS sequence of a PUSCH and a power usage state combination. As shown in FIG. 9, in the PUSCH, one power usage state combination corresponds to a DMRS sequence of one PUSCH (a gray part in the figure represents the DMRS sequence of the PUSCH), so that {PRACH_max, PUSCH_max}, {PRACH_required, PUSCH_required}, {PRACH_max, PUSCH required}, and {PRACH_required, PUSCH_max} may be mapped to DMRS sequences of different PUSCHs (or mapped to different sequences). In this way, after receiving the PUSCH, the base station may determine respective power usage states of the PUSCH and the PRACH based on the DMRS of the PUSCH transmitted by the terminal.

For another example, similarly, a mapping relationship between the time domain resource of the PUSCH and the power usage state combination may be established. Specifically, one power usage state combination may be set to correspond to the time domain resource of one PUSCH, so that different power usage state combinations may correspond to different time domain resources of the PUSCH. In this way, after receiving the PUSCH, the base station may determine the respective power usage states of the PUSCH and the PRACH based on a time (namely, a time domain resource) for transmitting the PUSCH by the terminal.

For another example, similarly, a mapping relationship between the frequency domain resource of the PUSCH and the power usage state combination may be established. Specifically, one power usage state combination may be set to correspond to the frequency domain resource of one PUSCH, so that different power usage state combinations may be mapped to different frequency domain resources. In this way, after receiving the PUSCH, the base station may determine the respective power usage states of the PUSCH and the PRACH based on a frequency domain resource for transmitting the PUSCH by the terminal.

In addition, when the indication information indicates the quantized value of the difference between the transmit powers of the preamble and the PUSCH, the terminal may establish a mapping relationship between a time domain resource and/or a frequency domain resource of the PUSCH, or a DMRS sequence of the PUSCH and a quantized power deviation value, and indicate the quantized power deviation value to the base station by using the mapping relationship. For a specific implementation process, refer to the foregoing related descriptions. Details are not described herein again.

Operation 402: The base station performs channel estimation and demodulation on the PUSCH based on the indication information by using the random access preamble and the additional DMRS of the PUSCH.

In other words, the random access preamble and the additional DMRS of the PUSCH are jointly used as the demodulation reference signal when the base station receives uplink data (PUSCH data). Because there is a power difference between the PUSCH and the PRACH, the base station first determines a power deviation between the PUSCH and the preamble by using the indication information, and then performs channel estimation and uplink data demodulation on the PUSCH based on the power deviation by using the random access preamble and the additional DMRS of the PUSCH.

Operation 403: The base station sends a random access response and/or a contention resolution message to the terminal. For a specific implementation of this operation, refer to related descriptions of operation 203 in the embodiment in FIG. 5. Details are not described herein again.

It can be learned that in this embodiment of the present disclosure, the preamble and the additional DMRS of the PUSCH are jointly used as a Msg3, namely, the demodulation reference signal of the PUSCH, and the PUSCH only needs to carry low-density DMRSs (namely, additional DMRSs). When sending the preamble and the PUSCH, the terminal sends, to the base station, indication information used to indicate a transmit power deviation. In this way, the base station can successfully demodulate uplink data of the PUSCH by using the preamble and the additional DMRS of the PUSCH based on the power deviation. Therefore, implementing the technical solutions of the present disclosure can improve radio resource utilization, and meet a scenario requirement of large-scale terminal access.

Figure 10:
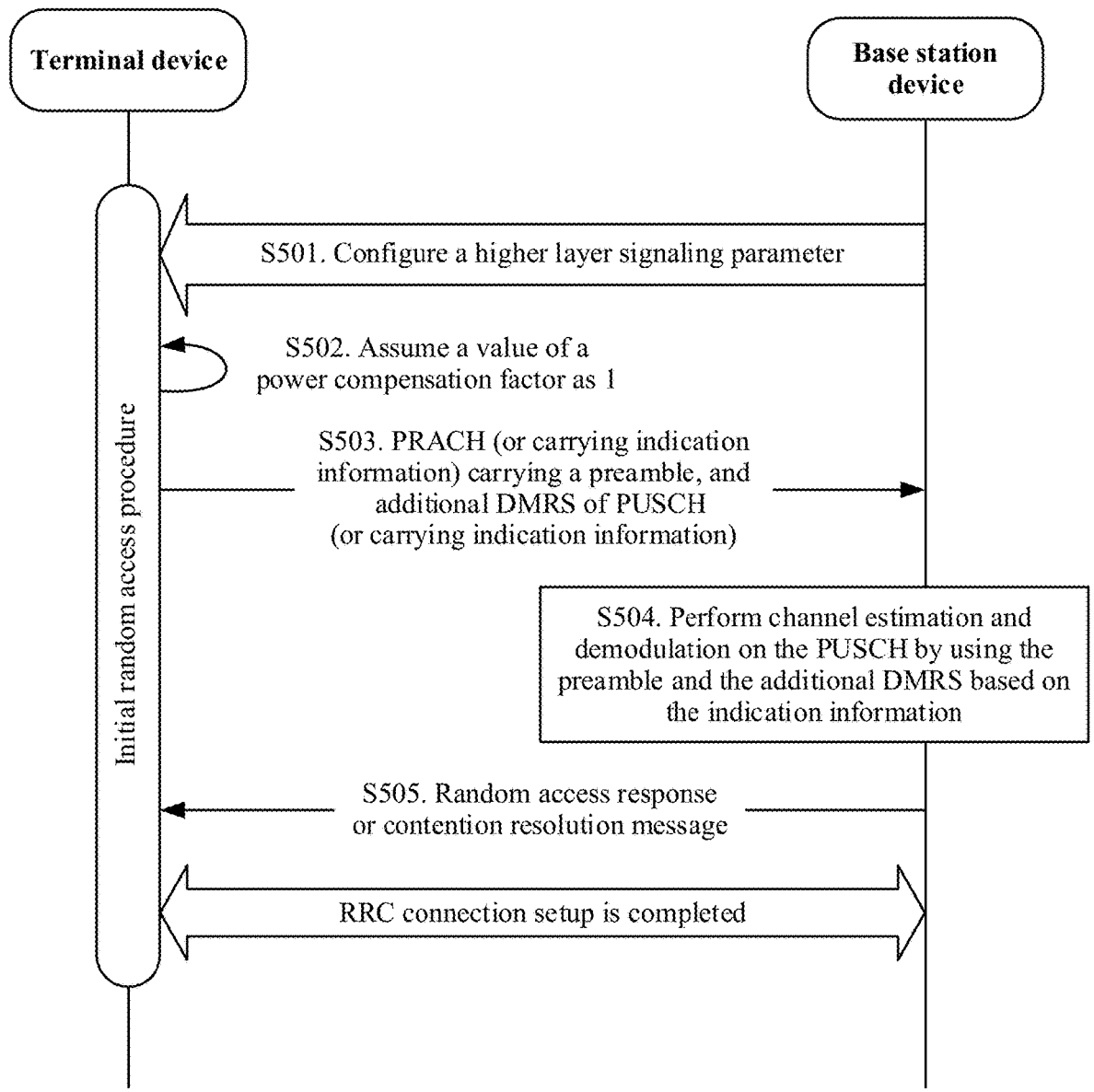
FIG. 10 is a flowchart of still another transmission method according to an embodiment of the present disclosure.

Referring to FIG. 10, FIG. 10 is a flowchart of a transmission method according to an embodiment of the present disclosure. The method is described from a terminal side and a base station side. A main difference between the method and the method described in the embodiment in FIG. 7 lies in: In the embodiment in FIG. 7, only the random access preamble is used as a DMRS of the PUSCH; but in the method, the random access preamble is used as a front-loaded DMRS of the PUSCH, and the PUSCH further carries low-density additional DMRSs. The low-density herein means that a density of DMRSs of the PUSCH in the method is lower than that of DMRSs of the PUSCH in the related art. Specifically, the method includes but is not limited to the following operations.

Operation 501: A base station configures a higher layer signaling parameter for a terminal. For a specific implementation process, refer to related descriptions of operation 301 in the embodiment in FIG. 7. Details are not described herein again.

Operation 502: The terminal assumes a value of the power compensation factor as 1. For a specific implementation process, refer to related descriptions of operation 302 in the embodiment in FIG. 7. Details are not described herein again.

Operation 503: The terminal sends, at a first transmit power, a random access preamble carried in a PRACH, and sends a PUSCH at a second transmit power. Correspondingly, a base station receives the random access preamble and the PUSCH.

The random access preamble is used as a front-loaded demodulation reference signal of the PUSCH; and a demodulation reference signal of the PUSCH further includes an additional demodulation reference signal of the PUSCH. The front-loaded demodulation reference signal and the additional demodulation reference signal are jointly used for demodulation of the PUSCH.

In addition, the PRACH or the PUSCH is further used to carry indication information, and the indication information is used to enable the base station to determine a power deviation between the first transmit power and the second transmit power.

For a specific implementation process of this operation, refer to related descriptions of operation 401 in the embodiment in FIG. 8. Details are not described herein again.

Operation 504: The base station performs channel estimation and demodulation on the PUSCH based on the indication information by using the random access preamble and the additional DMRS of the PUSCH. For a specific implementation process, refer to related descriptions of operation 402 in the embodiment in FIG. 8. Details are not described herein again.

Operation 505: The base station sends a random access response and/or a contention resolution message to the terminal. For a specific implementation of this operation, refer to related descriptions of operation 203 in the embodiment in FIG. 5. Details are not described herein again.

It can be learned that in this embodiment of the present disclosure, the preamble and the additional DMRS of the PUSCH are used as a Msg3, namely, the demodulation reference signal of the PUSCH, and the PUSCH only needs to carry a low-density DMRS (namely, an additional DMRS). In addition, the terminal assumes the value of the power compensation factor of the PUSCH as 1. When sending the preamble and the PUSCH, the terminal sends, to the base station, indication information used to indicate power usage states of the PUSCH and the preamble. In this way, the base station can determine whether transmit powers of the PUSCH and the PRACH of the terminal are respectively a calculated power or a full power, and can calculate a power deviation between the transmit powers of the PUSCH and the PRACH, so that uplink data of the PUSCH can be successfully demodulated by using the preamble and the additional DMRS. Therefore, implementing the technical solutions of the present disclosure can improve radio resource utilization, meet a scenario requirement of large-scale terminal access, and improve reliability of the two-operation random access procedure.

Figure 11:
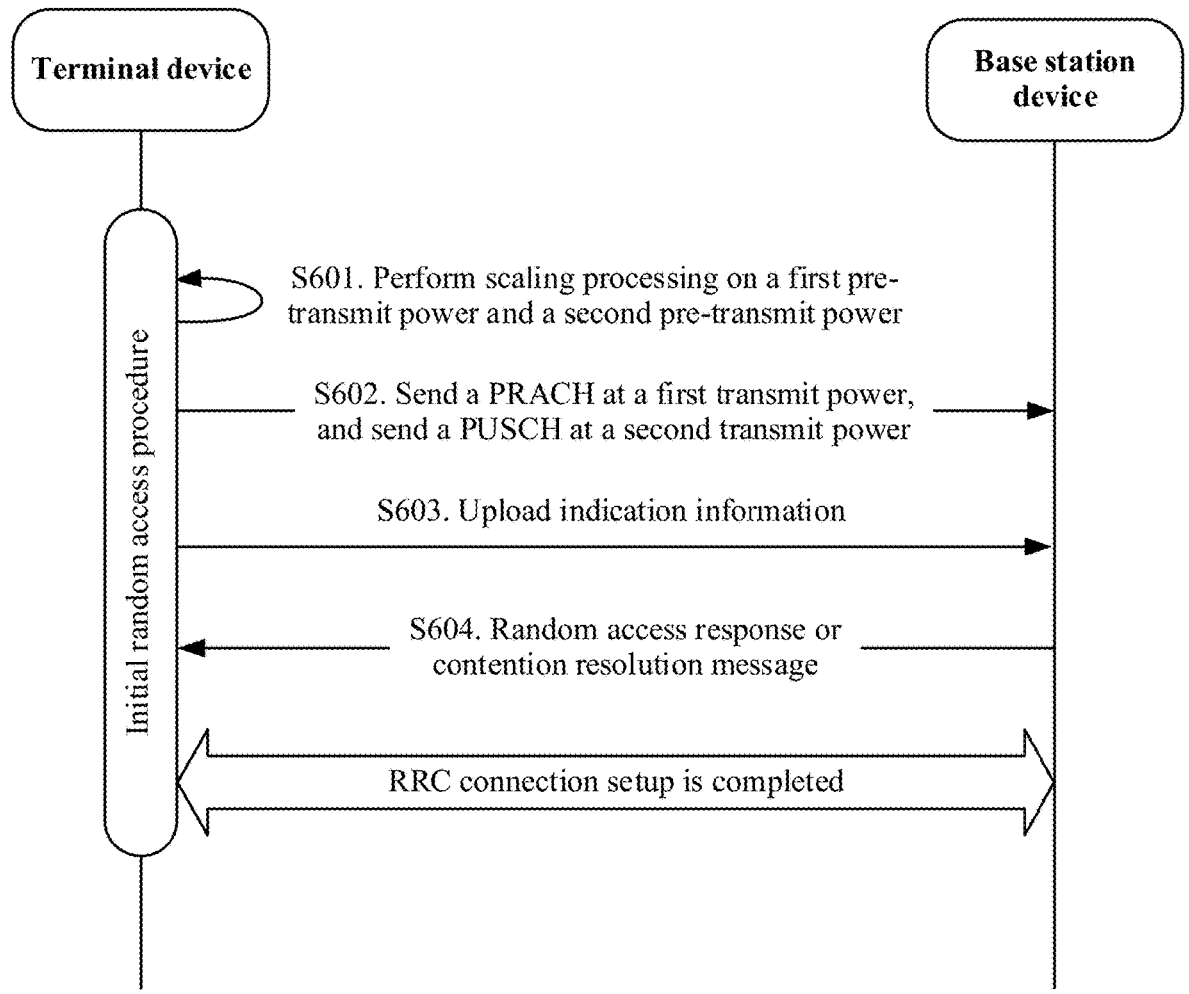
FIG. 11 is a flowchart of still another transmission method according to an embodiment of the present disclosure.

Referring to FIG. 11, FIG. 11 is a flowchart of a transmission method according to an embodiment of the present disclosure. The method is described from a terminal side and a base station side. A difference between the method and the method described in the embodiment in FIG. 4 lies in: The method describes a case of frequency division multiplexing on a PRACH and a PUSCH. The method includes but is not limited to the following operations.

Operation 601: A terminal performs scaling processing on a first pre-transmit power of the PRACH and a second pre-transmit power of the PUSCH.

The first pre-transmit power of the PRACH is a smaller value between a first calculated power and a full power (namely, a maximum transmit power) of the PRACH; and the second pre-sent power of the PUSCH is a smaller value between a second calculated power and a full power (namely, a maximum transmit power) of the PUSCH.

Specifically, in a case of frequency division multiplexing on the PRACH and the PUSCH, because the terminal needs to simultaneously send a preamble and the PUSCH on a same symbol in a same slot, the terminal needs to control a sum of transmit powers of the PRACH and the PUSCH to not exceed a maximum transmit power of the terminal.

When a power of the PRACH and a pre-transmit power of the PUSCH are greater than the maximum transmit power, the terminal separately performs scaling processing on the power of the PRACH and the pre-transmit power of the PUSCH, uses the power of the PRACH after the scaling processing as the first transmit power, and uses the power of the PUSCH after the scaling processing as the second transmit power, to ensure that a sum of the first transmit power and the second transmit power is less than or equal to the maximum transmit power of the terminal. Herein, a priority of scaling processing may, in one embodiment, be: PRACH>PUSCH.

In one embodiment, a scale factor (or referred to as a scaling factor) configured by the base station for power allocation between the PRACH and the PUSCH may also be predefined or received. For example, the scale factor is 30%. Because the priority of scaling processing is In one embodiment PRACH>PUSCH, when scaling processing needs to be performed, the power of the PRACH is scaled by 30%, and correspondingly, the power of the PUSCH may be scaled by 70% or another predefined proportion.

In one embodiment, the terminal may separately predefine or configure respective scale factors (or referred to as a first scaling factor and a second scaling factor) of the PRACH and the PUSCH. For example, a candidate value of a scale factor combination between the PRACH and the PUSCH may be any one of (70%, 30%), (60%, 40%), or (50%, 50%). This is not specifically limited herein It should be noted that, in the foregoing example, an example in which the sum of the first transmit power and the second transmit power is equal to the maximum transmit power of the terminal is used for description. However, in actual application, the sum of the first transmit power and the second transmit power may also be less than the maximum transmit power. This is not specifically limited herein.

Operation 602: The terminal sends the PRACH at the first transmit power (namely, the first pre-transmit power obtained after the scaling processing), and sends the PUSCH at the second transmit power (namely, the second pre-transmit power obtained after the scaling processing). Correspondingly, the base station receives the PRACH and the PUSCH. For a specific implementation, refer to related descriptions of operation 101 in the embodiment in FIG. 4. Details are not described herein again.

Operation 603: The terminal uploads indication information to the base station, and correspondingly, the base station obtains the indication information. For a specific implementation, refer to related descriptions of operation 102 in the embodiment in FIG. 4. Details are not described herein again.

Operation 604: The base station sends a random access response and/or a contention resolution message to the terminal. For a specific implementation, refer to related descriptions of operation 103 in the embodiment in FIG. 4. Details are not described herein again.

It can be learned that, according to this embodiment of the present disclosure, in a case of frequency division multiplexing on the PRACH and the PUSCH, the terminal performs scaling processing on transmit powers of the PRACH and the PUSCH, to avoid damage to transmit performance of the terminal; and then, transmits indication information to the base station in the two-operation random access procedure, so that the base station can determine the transmit power deviation between the PRACH and the PUSCH based on the indication information. In this way, it is ensured that the two-operation random access procedure is implemented successfully, thereby reducing an access delay of the terminal in radio access, and improving transmission efficiency and service processing reliability of the base station in the random access procedure.

The foregoing describes the method in the embodiments of the present disclosure in detail, and the following provides a related apparatus in the embodiments of the present disclosure.

Figure 12:
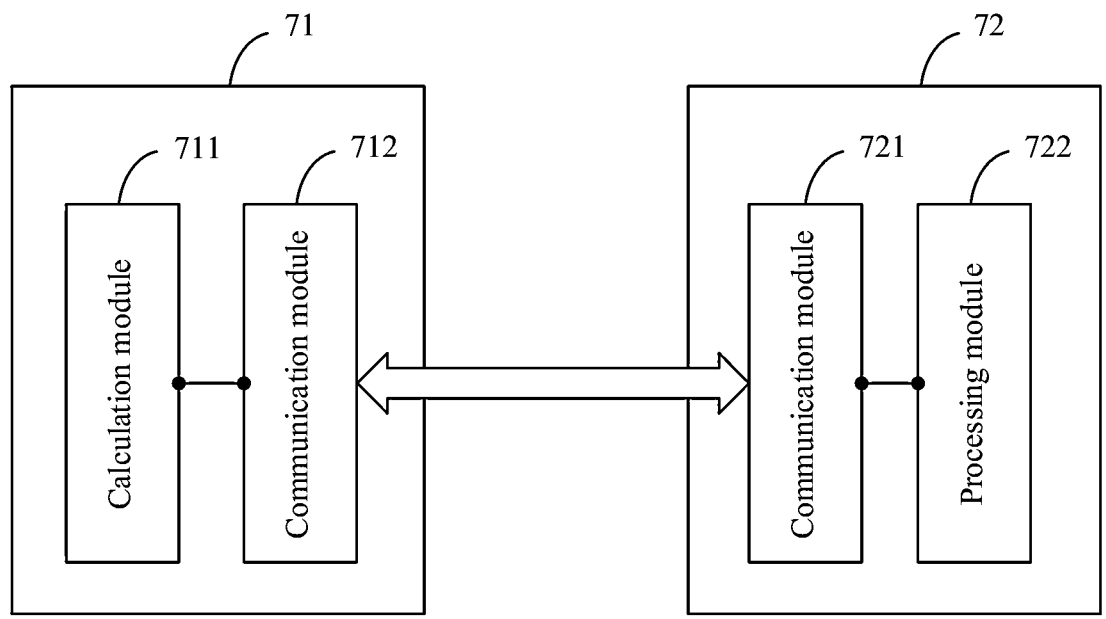
FIG. 12 is a structural block diagram of a communication system and a structural diagram of a terminal and a base station in the communication system according to an embodiment of the present disclosure.

FIG. 12 is a structural block diagram of a communication system according to an embodiment of the present disclosure. The communication system includes a terminal 71 and a base station 72. The terminal 71 and the base station 72 may implement wireless communication connections by using respective communication modules.

The terminal 71 includes a calculation module 711 and a communication module 712. In one embodiment, data/programs of these function modules may be stored in the following memory 801, and the calculation module 711 and the communication module 712 may be run on the following processor 802. In addition, function implementation of the communication module 712 depends on the following transceiver 803 to perform signal transmission and reception on an uplink/downlink channel.

In some embodiments, the calculation module 711 is configured to calculate a first transmit power used for sending a random access preamble and a second transmit power used for sending a PUSCH. The communication module 712 is configured to: send the random access preamble to the base station at the first transmit power, and send the PUSCH to the base station at the second transmit power, where a power deviation between the first transmit power and the second transmit power is indicated to the base station by using indication information. The communication module 712 is further configured to receive a random access response or a contention resolution message from the base station.

In some other embodiments, the communication module 712 is configured to receive a higher layer signaling parameter of a random access preamble and a higher layer signaling parameter of a PUSCH that are sent by the base station, where the higher layer signaling parameter of the PUSCH includes a power compensation factor. The calculation module 711 is configured to: obtain the higher layer signaling parameter of the random access preamble and the higher layer signaling parameter of the PUSCH, where both the higher layer signaling parameter of the random access preamble and the higher layer signaling parameter of the PUSCH are configured by the base station for the terminal, and the higher layer signaling parameter of the PUSCH includes the power compensation factor; obtain a first calculated power based on the higher layer signaling parameter of the random access preamble and a path loss value obtained by the terminal, and obtain a first transmit power based on the first calculated power; and assume a value of the power compensation factor as 1, obtain a second calculated power based on the higher layer signaling parameter of the PUSCH and the path loss value obtained by the terminal, and obtain a second transmit power based on the second calculated power. The communication module 712 is further configured to: send a PRACH that carries the random access preamble to the base station at the first transmit power, and send the PUSCH to the base station at the second transmit power, where the PRACH is used to carry the random access preamble, and the random access preamble is used as a demodulation reference signal or front-loaded demodulation reference signal of the PUSCH. The communication module 712 is further configured to receive the random access response or the contention resolution message from the base station.

In still some other embodiments, the calculation module 711 is configured to calculate a first pre-transmit power of a random access preamble and a second pre-transmit power of a PUSCH, where the first pre-transmit power is a smaller value between a first calculated power and a maximum transmit power, and the second pre-transmit power is a smaller value between a second calculated power and the maximum transmit power. The calculation module 711 is further configured to perform power scaling processing on the first pre-transmit power and the second pre-transmit power based on a scaling factor, to obtain a first transmit power and a second transmit power, where a sum of the first transmit power and the second transmit power is less than or equal to the maximum transmit power, and the scaling factor is predefined or configured by the base station for the terminal. The communication module 712 is configured to: send the random access preamble to the base station at the first transmit power, and send the PUSCH to the base station at the second transmit power. The communication module 712 is further configured to receive a random access response or a contention resolution message from the base station.

The base station 72 includes a communication module 721 and a processing module 722. In one embodiment, data/programs of these function modules may be stored in the following memory 901, and the communication module 721 and the processing module 722 may be run on the following processor 902. In addition, function implementation of the communication module 721 depends on the following transceiver 903 to perform signal transmission and reception on an uplink/downlink channel.

In still some other embodiments, the communication module 721 is configured to: receive a random access preamble sent by a terminal at a first transmit power, and receive a PUSCH sent by the terminal at a second transmit power. The processing module 722 is configured to determine a power deviation between the first transmit power and the second transmit power by using indication information. Specifically, the processing module 722 determines a power deviation between the random access preamble and the PUSCH based on the indication information, and performs channel estimation and demodulation on the PUSCH by using the random access preamble; or determines a power deviation between the random access preamble and the PUSCH based on the indication information, and performs channel estimation and demodulation on the PUSCH by using the random access preamble and an additional demodulation reference signal. The communication module 721 is further configured to send a random access response or a contention resolution message to the terminal.

It should be noted that, in a specific embodiment of the present disclosure, the terminal 71 may be the terminal in the embodiment in FIG. 4, FIG. 5, FIG. 7, FIG. 8, FIG. 10, or FIG. 11, and the base station 72 may be the base station in the embodiment in FIG. 4, FIG. 5, FIG. 7, FIG. 8, FIG. 10, or FIG. 11. That is, in one embodiment, for function implementation of each module of the terminal 71 and the base station 72, refer to descriptions of related method operations in the foregoing embodiments. For brevity of this specification, details are not described herein again.

Figure 13:
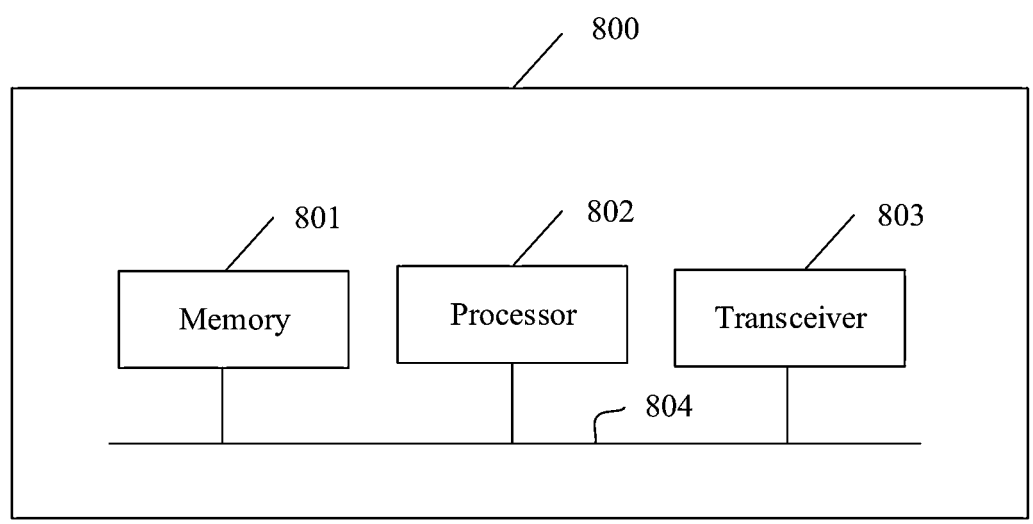
FIG. 13 is a structural diagram of still another apparatus according to an embodiment of the present disclosure.

FIG. 13 shows still another apparatus 800 according to an embodiment of the present disclosure. The apparatus 800 is, for example, the terminal described in the embodiments of the present disclosure. The apparatus 800 includes a processor 802, a memory 801, and a transceiver 803. The processor 802, the memory 801, and the transceiver 803 are connected to each other by using a bus 804.

The memory 801 includes but is not limited to a random access memory (English: Random Access Memory, RAM for short), a read-only memory (English: Read-Only Memory, ROM for short), an erasable programmable read-only memory (English: Erasable Programmable Read Only Memory, EPROM for short), or a portable read-only memory (English: Compact Disc Read-Only Memory, CD-ROM for short). The memory 801 is configured to store related instructions and related data.

The transceiver 803 is configured to: receive data (for example, the higher layer signaling, the random access response, and the contention resolution message) sent by the base station, or send data (for example, send the preamble and the PUSCH) to the base station.

The processor 802 may be one or more central processing units (CPU). When the processor 802 is one CPU, the CPU may be a single-core CPU or a multi-core CPU.

In some embodiments, the processor 802 in the apparatus 800 is configured to read program code stored in the memory 801, to perform operations of a related method procedure of the terminal in the embodiment in FIG. 4.

In some embodiments, the processor 802 in the apparatus 800 is configured to read program code stored in the memory 801, to perform operations of a related method procedure of the terminal in the embodiment in FIG. 5.

In some embodiments, the processor 802 in the apparatus 800 is configured to read program code stored in the memory 801, to perform operations of a related method procedure of the terminal in the embodiment in FIG. 7.

In some embodiments, the processor 802 in the apparatus 800 is configured to read program code stored in the memory 801, to perform operations of a related method procedure of the terminal in the embodiment in FIG. 8.

In some embodiments, the processor 802 in the apparatus 800 is configured to read program code stored in the memory 801, to perform operations of a related method procedure of the terminal in the embodiment in FIG. 10.

In some embodiments, the processor 802 in the apparatus 800 is configured to read program code stored in the memory 801, to perform operations of a related method procedure of the terminal in the embodiment in FIG. 11.

Figure 14:
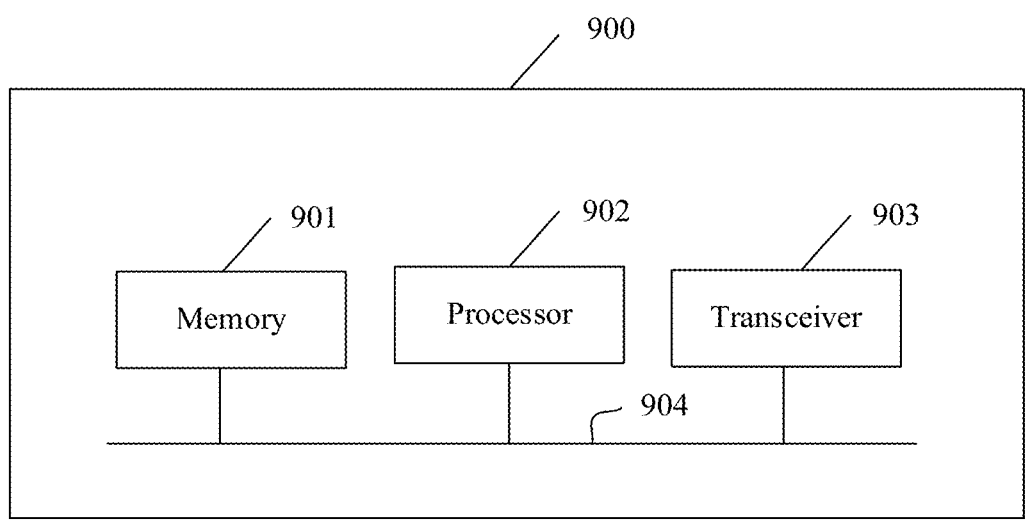
FIG. 14 is a structural diagram of still another apparatus according to an embodiment of the present disclosure.

FIG. 14 shows still another apparatus 900 according to an embodiment of the present disclosure. The apparatus 900 is, for example, the base station described in the embodiments of the present disclosure. The apparatus 900 includes a processor 902, a memory 901, and a transceiver 903. The processor 902, the memory 901, and the transceiver 903 are connected to each other by using a bus 904.

The memory 901 includes but is not limited to a random access memory (RAM), a read-only memory (ROM), an erasable programmable read-only memory (EPROM), or a portable read-only memory (CD-ROM). The memory 801 is configured to store related instructions and related data.

The transceiver 903 is configured to: receive data (such as a PRACH resource and a PUSCH resource) sent by the terminal, or send data (such as send higher layer signaling, the random access response, and the contention resolution message) to the terminal.

The processor 902 may be one or more central processing units (CPU). When the processor 901 is one CPU, the CPU may be a single-core CPU or a multi-core CPU.

In some embodiments, the processor 902 in the apparatus 900 is configured to read program code stored in the memory 901, to perform operations of a related method procedure of the base station in the embodiment in FIG. 4, FIG. 5, FIG. 7, FIG. 8, FIG. 10, or FIG. 11.

In some embodiments, the processor 902 in the apparatus 900 is configured to read program code stored in the memory 901, to perform operations of a related method procedure of the base station in the embodiment in FIG. 4.

In some embodiments, the processor 902 in the apparatus 900 is configured to read program code stored in the memory 901, to perform operations of a related method procedure of the base station in the embodiment in FIG. 5.

In some embodiments, the processor 902 in the apparatus 900 is configured to read program code stored in the memory 901, to perform operations of a related method procedure of the base station in the embodiment in FIG. 7.

In some embodiments, the processor 902 in the apparatus 900 is configured to read program code stored in the memory 901, to perform operations of a related method procedure of the base station in the embodiment in FIG. 8.

In some embodiments, the processor 902 in the apparatus 900 is configured to read program code stored in the memory 901, to perform operations of a related method procedure of the base station in the embodiment in FIG. 10.

In some embodiments, the processor 902 in the apparatus 900 is configured to read program code stored in the memory 901, to perform operations of a related method procedure of the base station in the embodiment in FIG. 11.

Based on a same inventive concept, an embodiment of the present disclosure provides still another apparatus. In one embodiment, the apparatus may be a chip. The apparatus includes a processor and a memory coupled to the processor.

The memory is configured to store computer program instructions.

The processor is configured to: execute the computer program instructions stored in the memory, to calculate a first transmit power used for sending a random access preamble and a second transmit power used for sending a physical uplink shared channel PUSCH; generate indication information, to indicate a power deviation between the first transmit power and the second transmit power to a base station; receive and process a random access response or a contention resolution message from the base station.

In a possible embodiment, the chip may be coupled to a transceiver. The transceiver may be configured to send data to the base station or receive data from the base station, for example, configured to send the random access preamble to the base station at the first transmit power, and send the PUSCH to the base station at the second transmit power, and for another example, configured to receive the random access response or the contention resolution message from the base station.

In a possible embodiment, the chip may be used in a terminal. For a specific function implementation of the chip, refer to descriptions of a related function of the terminal in any embodiment in FIG. 4, FIG. 5, FIG. 7, FIG. 8, FIG. 10, or FIG. 11. Details are not described herein again.

Based on a same inventive concept, an embodiment of the present disclosure provides still another apparatus. In one embodiment, the apparatus may be a chip. The apparatus includes a processor and a memory coupled to the processor.

The memory is configured to store computer program instructions.

The processor is configured to execute the computer program instructions stored in the memory, to determine a power deviation between a first transmit power used for a random access preamble from the terminal and a second transmit power used for a PUSCH; may be configured to: demodulate the PUSCH based on the power deviation and by using the random access preamble or by using the random access preamble and an additional demodulation reference signal of the PUSCH; and may further be configured to generate a random access response or a contention resolution message for the terminal.

In a possible embodiment, the chip may be coupled to a transceiver. The transceiver may be configured to send data to the terminal or receive data from the terminal, for example, may be configured to receive the random access preamble sent by the terminal and receive the PUSCH sent by the terminal. In a possible embodiment, the transceiver is further configured to receive indication information sent by the terminal. For another example, the transceiver is further configured to send the random access response or the contention resolution message to the terminal.

In a possible embodiment, the chip may be used in a base station. For a specific function implementation of the chip, refer to descriptions of a related function of the base station in any embodiment in FIG. 4, FIG. 5, FIG. 7, FIG. 8, FIG. 10, or FIG. 11. Details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions, and when the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the descriptions of each embodiment have respective focuses. For a part that is not described in detail in an embodiment, refer to related descriptions in other embodiments.

What is claimed is:

1. A transmission method, performed by a base station, or a chip for the base station, comprising:
   receiving a random access preamble at a first transmit power from a terminal;
   receiving uplink data on a physical uplink shared channel (PUSCH) at a second transmit power from the terminal;
   obtaining indication information associated with a power deviation between the first transmit power and the second transmit power, wherein the indication information is obtained based on one of following:
   a mapping relationship between the indication information and a time domain resource of physical random access channel (PRACH) that carries the random access preamble; or
   a mapping relationship between the indication information and a frequency domain resource of the PRACH that carries the random access preamble; or
   a mapping relationship between the indication information and a time domain resource of the uplink data on the PUSCH; or
   a mapping relationship between the indication information and a frequency domain resource of the uplink data on the PUSCH; or
   a mapping relationship between the indication information and an additional demodulation reference signal sequence of the uplink data on the PUSCH;
   determining the power deviation between the first transmit power and the second transmit power by using indication information;
   demodulating the uplink data on the PUSCH by using the random access preamble; and
   sending a random access response or a contention resolution message to the terminal.

2. The method according to claim 1, wherein the random access preamble is used as a demodulation reference signal of the uplink data on the PUSCH.

3. The method according to claim 1, wherein the random access preamble is used as a front-loaded demodulation reference signal of the uplink data on the PUSCH; and a demodulation reference signal of the uplink data on the PUSCH further comprises an additional demodulation reference signal of the uplink data on the PUSCH.

4. An apparatus, comprising:
   a processor; and
   a memory coupled to the processor to store instructions, which when executed by the processor, cause the processor to:
   calculate a first transmit power for sending a random access preamble and a second transmit power for sending uplink data on a physical uplink shared channel (PUSCH);
   send the random access preamble to a base station at the first transmit power;
   send the uplink data on the PUSCH to the base station at the second transmit power,
   obtain indication information associated with a power deviation between the first transmit power and the second transmit power, wherein the indication information is indicated based on one of following:
   a mapping relationship between the indication information and a time domain resource of physical random access channel (PRACH) that carries the random access preamble; or
   a mapping relationship between the indication information and a frequency domain resource of the PRACH that carries the random access preamble; or a mapping relationship between the indication information and a time domain resource of the uplink data on the PUSCH; or a mapping relationship between the indication information and a frequency domain resource of the uplink data on the PUSCH; or a mapping relationship between the indication information and an additional demodulation reference signal sequence of the uplink data on the PUSCH, wherein the random access preamble is used for demodulation of the uplink data on the PUSCH; and receive a random access response or a contention resolution message from the base station.

5. The apparatus according to claim 4, wherein the processor is further to:

receive a higher layer signaling parameter of the random access preamble and a higher layer signaling parameter of the uplink data on the PUSCH, wherein the higher layer signaling parameter of the uplink data on the PUSCH comprises a power compensation factor;

determine a first calculated power based on the higher layer signaling parameter of the random access preamble and a path loss value obtained by the apparatus, and determine the first transmit power based on the first calculated power; and provided a value of the power compensation factor as 1, determine a second calculated power based on the higher layer signaling parameter of the uplink data on the PUSCH and the path loss value obtained by the apparatus, and determine the second transmit power based on the second calculated power.

6. The apparatus according to claim 5, wherein the processor is further to:

perform power scaling processing on a first pre-transmit power and a second pre-transmit power based on a scaling factor, to determine the first transmit power and the second transmit power, wherein a sum of the first transmit power and the second transmit power is less than or equal to a maximum transmit power of the apparatus, wherein the scaling factor is predefined or configured by the base station for the apparatus, wherein the first pre-transmit power is a smaller value between the first calculated power and the maximum transmit power, and wherein the second pre-transmit power is a smaller value between the second calculated power and the maximum transmit power.

7. The apparatus according to claim 4, wherein the random access preamble is used as a demodulation reference signal of the uplink data on the PUSCH.

8. The apparatus according to claim 4, wherein the random access preamble is used as a front-loaded demodulation reference signal of the uplink data on the PUSCH; and a demodulation reference signal of the uplink data on the PUSCH further comprises an additional demodulation reference signal of the uplink data on the PUSCH.

9. An apparatus, comprising:
a processor; and
a memory coupled to the processor to store instructions, which when executed by the processor, cause the processor to:

receive a random access preamble at a first transmit power from a terminal;

receive uplink data on a physical uplink shared channel (PUSCH) at a second transmit power from the terminal;

obtain indication information associated with a power deviation between the first transmit power and the second transmit power, wherein the indication information is obtained based on one of following:

a mapping relationship between the indication information and a time domain resource of physical random access channel (PRACH) that carries the random access preamble; or a mapping relationship between the indication information and a frequency domain resource of the PRACH that carries the random access preamble; or a mapping relationship between the indication information and a time domain resource of the uplink data on the PUSCH;

a mapping relationship between the indication information and a frequency domain resource of the uplink data on the PUSCH; or a mapping relationship between the indication information and an additional demodulation reference signal sequence of the uplink data on the PUSCH;

determine the power deviation between the first transmit power and the second transmit power by using indication information;

demodulate the uplink data on the PUSCH by using the random access preamble; and send a random access response or a contention resolution message to the terminal.

10. The apparatus according to claim 9, wherein
the random access preamble is used as a demodulation reference signal of the uplink data on the PUSCH.

11. The apparatus according to claim 9, wherein the random access preamble is used as a front-loaded demodulation reference signal of the uplink data on the PUSCH; and a demodulation reference signal of the uplink data on the PUSCH further comprises an additional demodulation reference signal of the uplink data on the PUSCH.

12. The apparatus according to claim 9, wherein the indication information is further to indicate at least one of an attribute of the first transmit power or an attribute of the second transmit power, wherein the attribute of the first transmit power is a maximum transmit power of the terminal or a first calculated power of the random access preamble; or the attribute of the second transmit power is a maximum transmit power of the terminal or a second calculated power of the uplink data on the PUSCH.

13. The apparatus according to claim 12, wherein when the first calculated power is greater than or equal to the maximum transmit power, the attribute of the first transmit power is the maximum transmit power;

when the first calculated power is less than the maximum transmit power, the attribute of the first transmit power is the first calculated power;

when the second calculated power is greater than or equal to the maximum transmit power, the attribute of the second transmit power is the maximum transmit power; or when the second calculated power is less than the maximum transmit power, the attribute of the second transmit power is the second calculated power.

\* \* \* \* \*